(12) United States Patent
Wood

(10) Patent No.: US 10,323,131 B2
(45) Date of Patent: Jun. 18, 2019

(54) COMBINATION OF SUBSTITUTED CYCLODEXTRIN COMPOUND AND ACTIVATED CARBON

(71) Applicant: Cellresin Technologies, LLC, Bloomington, MN (US)

(72) Inventor: Willard E. Wood, Arden Hills, MN (US)

(73) Assignee: Cellresin Technologies, LLC, St. Paul, MN (US)

( * ) Notice: Subject to any disclaimer, the term of this patent is extended or adjusted under 35 U.S.C. 154(b) by 78 days.

(21) Appl. No.: 15/140,000

(22) Filed: Apr. 27, 2016

(65) Prior Publication Data

US 2016/0319085 A1    Nov. 3, 2016

Related U.S. Application Data

(60) Continuation of application No. 13/303,552, filed on Nov. 23, 2011, now abandoned, which is a division of application No. 12/033,649, filed on Feb. 19, 2008, now abandoned.

(60) Provisional application No. 60/890,707, filed on Feb. 20, 2007.

(51) Int. Cl.
| | |
|---|---|
| *B29B 9/06* | (2006.01) |
| *B29B 9/12* | (2006.01) |
| *C08J 3/22* | (2006.01) |
| *C08B 37/16* | (2006.01) |
| *C08K 3/04* | (2006.01) |
| *C08L 5/16* | (2006.01) |
| *C08L 23/02* | (2006.01) |
| *C08L 67/00* | (2006.01) |
| *C08L 67/02* | (2006.01) |
| *C08L 87/00* | (2006.01) |
| *B29C 47/00* | (2006.01) |
| *B29K 67/00* | (2006.01) |

(52) U.S. Cl.
CPC ............... *C08J 3/226* (2013.01); *B29B 9/06* (2013.01); *B29B 9/12* (2013.01); *B29C 47/0026* (2013.01); *C08B 37/0012* (2013.01); *C08K 3/04* (2013.01); *C08L 5/16* (2013.01); *C08L 23/02* (2013.01); *C08L 67/02* (2013.01); *B29C 47/00* (2013.01); *B29K 2067/003* (2013.01); *C08J 2367/02* (2013.01); *C08J 2405/16* (2013.01); *C08J 2467/00* (2013.01); *C08L 67/00* (2013.01); *C08L 87/00* (2013.01)

(58) Field of Classification Search
CPC .. B29B 9/06; B29B 9/12; B29C 47/00; B29C 47/0026; B29K 2067/003; C08B 37/0012; C08J 3/226; C08J 2405/16; C08J 2467/00; C08J 2367/02; C08K 3/04; C08L 5/16; C08L 23/02; C08L 67/00; C08L 67/02; C08L 87/00
See application file for complete search history.

(56) References Cited

U.S. PATENT DOCUMENTS

| | | | |
|---|---|---|---|
| 4,131,581 A | 12/1978 | Coker | |
| 5,001,176 A | 3/1991 | Nakazima | |
| 5,137,571 A | 8/1992 | Eisenhart et al. | |
| 5,569,756 A | 10/1996 | Qi et al. | |
| 5,721,187 A | 2/1998 | Ogawa et al. | |
| 5,804,266 A | 9/1998 | Salyer | |
| 5,854,320 A | 12/1998 | Nakamura et al. | |
| 6,358,578 B1 | 3/2002 | Otto et al. | |
| 6,417,320 B1 | 7/2002 | Otto et al. | |
| 6,709,746 B2 * | 3/2004 | Wood ............. | C08J 3/203 428/357 |
| 6,790,499 B2 | 9/2004 | Andrews et al. | |
| 6,827,767 B2 | 12/2004 | Miyamoto et al. | |
| 6,827,854 B2 | 12/2004 | Mitchell et al. | |
| 6,833,342 B2 | 12/2004 | Woo et al. | |
| 6,849,111 B2 | 2/2005 | Suzuki et al. | |
| 6,974,603 B2 | 12/2005 | Wood et al. | |
| 7,018,712 B2 | 3/2006 | Wood et al. | |
| 7,060,749 B2 | 6/2006 | Honma et al. | |
| 7,109,324 B1 | 9/2006 | Todd et al. | |
| 7,189,777 B2 | 3/2007 | Quillen et al. | |

(Continued)

FOREIGN PATENT DOCUMENTS

| | | |
|---|---|---|
| CN | 101688002 A | 3/2010 |
| EP | 0454910 A1 | 11/1991 |

(Continued)

OTHER PUBLICATIONS

Non-Final Office Action for Canadian Patent Application No. 2678811 dated Dec. 9, 2013 (3 pages).
Non-Final Office Action for U.S. Appl. No. 12/033,649 dated Jan. 29, 2014 (16 pages).
Non-Final Office Action for U.S. Appl. No. 12/033,649 dated Apr. 25, 2013 (32 pages).
Office Action for Japanese Application No. 2009550977 dated Sep. 14, 2012, including English translation (9 pages).
Office Action for Japanese Application No. 2009550977 dated Jan. 9, 2013 (6 pages).
Response to Official Action dated Sep. 14, 2012, filed in Japanese Patent Application No. 2009550977 on Dec. 12, 2012 (12 pages).
Final Office Action in U.S. Appl. No. 12/033,649 dated Feb. 27, 2012 (38 pages).

(Continued)

*Primary Examiner* — Patrick D Niland
(74) *Attorney, Agent, or Firm* — Kagan Binder, PLLC

(57) ABSTRACT

The invention is a composition that can prevent formation in, or scavenge undesirable organic materials from, a polymer matrix. The composition contains cyclodextrin and particles of activated carbon. The composition can scavenge thermal decomposition products that can be produced during melt processing of a polymer, contaminants inherent in a polymer, or other types of impurities from a polymer matrix that otherwise may elute into the air, a water supply, or an ingestible material such as a food, a drug, or a beverage. Other aspects of the invention are blends of the composition with polymeric materials, methods of making blends, articles containing the composition, and methods of making articles containing the composition.

15 Claims, 8 Drawing Sheets

(56) References Cited

U.S. PATENT DOCUMENTS

| | | | |
|---|---|---|---|
| 7,767,735 | B2 | 8/2010 | Koganehira |
| 2002/0141898 | A1 | 10/2002 | Carlucci et al. |
| 2003/0179537 | A1 | 9/2003 | Tanaka et al. |
| 2004/0110901 | A1 | 6/2004 | Wood et al. |
| 2004/0146674 | A1 | 7/2004 | Howell, Jr. et al. |
| 2004/0197278 | A1 | 10/2004 | Gonzales et al. |
| 2004/0249113 | A1* | 12/2004 | Quillen ............... C08J 3/226 528/308 |
| 2005/0131119 | A1 | 6/2005 | Wood |
| 2005/0241657 | A1 | 11/2005 | Mua et al. |
| 2006/0140902 | A1* | 6/2006 | MacDonald ............ A61L 9/014 424/76.2 |
| 2008/0207821 | A1 | 8/2008 | Weber et al. |
| 2012/0100322 | A1 | 4/2012 | Harrison et al. |

FOREIGN PATENT DOCUMENTS

| | | |
|---|---|---|
| EP | 1031590 A2 | 8/2000 |
| EP | 1404385 A2 | 4/2004 |
| EP | 1559746 A1 | 8/2005 |
| JP | 01-176487 | 7/1989 |
| JP | 2002-509525 A | 3/2002 |
| WO | WO93/05084 A1 | 3/1993 |
| WO | WO98/18439 A1 | 5/1998 |
| WO | WO03/104308 A1 | 12/2003 |
| WO | WO2005/116136 A1 | 12/2005 |
| WO | WO2008103657 A2 | 8/2008 |

OTHER PUBLICATIONS

"4. Activated Carbon," 10 pages, (Publicly known at least as early as Nov. 27, 2006).

"Activated Carbon," www.kimyamuhendisi.corn, pp. 1-36 (Publicly known at least as early as Nov. 27, 2006).

"Granular Activated Carbon Selection," TIGG Corporation, file://C:\DOCUME~1/wwood\LOCALS~1\Temp\XCUN92MR.htm, pp. 1-10 (Copyright 2004-2006).

"The Filtration Spectrum," Osmonics, Inc., Minnetonka, MN, 1 page (Copyright 1984, 1990, 1993, 1996).

Cal, M., "Characterization of Gas Phase Adsorption Capacity of Untreated and Chemically Treated Activated Carbon Cloths," Thesis in partial fulfillment of the requirements for the degree of Doctor of Philosophy, University of Illinois at Urbana-Champaign, pp. iii-x, 1-87 (Copyright 1995).

DeSilva, F. "Filtration Media: The Issue of pH Adjustment in Acid-Washed Carbons" Water Conditioning & Purification, pp. 40-44 (May 2001).

Evans, R. et al., "Fracture Behavior of Particulate Reinforced Composites: Polymer Blends and MMCS," Proceedings of ICCM-10, Whistler, B.C., Canada, pp. 1-503-1-510 (Aug. 1995).

Giannelis, E., "A New Strategy for Synthesizing Polymer-Ceramic Nanocomposites," JOM, vol. 44, pp. 28-30 (Mar. 1992).

Gleiter, H., "Nanostructured Materials," Advanced Materials, vol. 4, No. 7/8, pp. 474-481 (Jul./Aug. 1992).

Lopez-Rubido et al., "Overview of Active Polymer-Based Packaging Technologies for Food Applications", Food Reviews International, 20:357-387 (2004).

Nielsen, L. "Simple Theory of Stress-Strain Properties of Filled Polymers," Journal of Applied Polymer Science, vol. 10, pp. 97-103 (1966).

Nielsen, L. et al., "Particulate-Filled Polymers," Mechanical Properties of Polymers and Composites, 2nd Edition, Chapter 7, pp. 401-411 (Copyright 1994).

Novak, B., "Hybrid Nanocomposite Materials—Between Inorganic Glasses and Organic Polymers," Advanced Materials, vol. 5, No. 6, pp. 422-433 (Jun. 1993).

Otterstedt, J. et al., "Applications of Small Particles," Small Particles Technology, Chapter 10, pp. 497-506 (1998).

Sumita, M. et al., "Dispersion of Fillers and the Electrical Conductivity of Polymer Blends Filled with Carbon Black," Polymer Bulletin, vol. 25, pp. 265-271 (1991).

Written Opinion dated Nov. 23, 2010 in co-pending Singapore Patent Application No. 200905530-2 (9 pages).

International Search and Written Opinion dated Sep. 26, 2008.

Invitation to Pay Additional Fees with Partial International Search dated Jul. 14, 2008.

File History (through Nov. 23, 2011) for U.S. Appl. No. 12/033,649, filed Feb. 19, 2008, (226 pages).

* cited by examiner

DIMENSIONS OF CYCLODEXTRINS

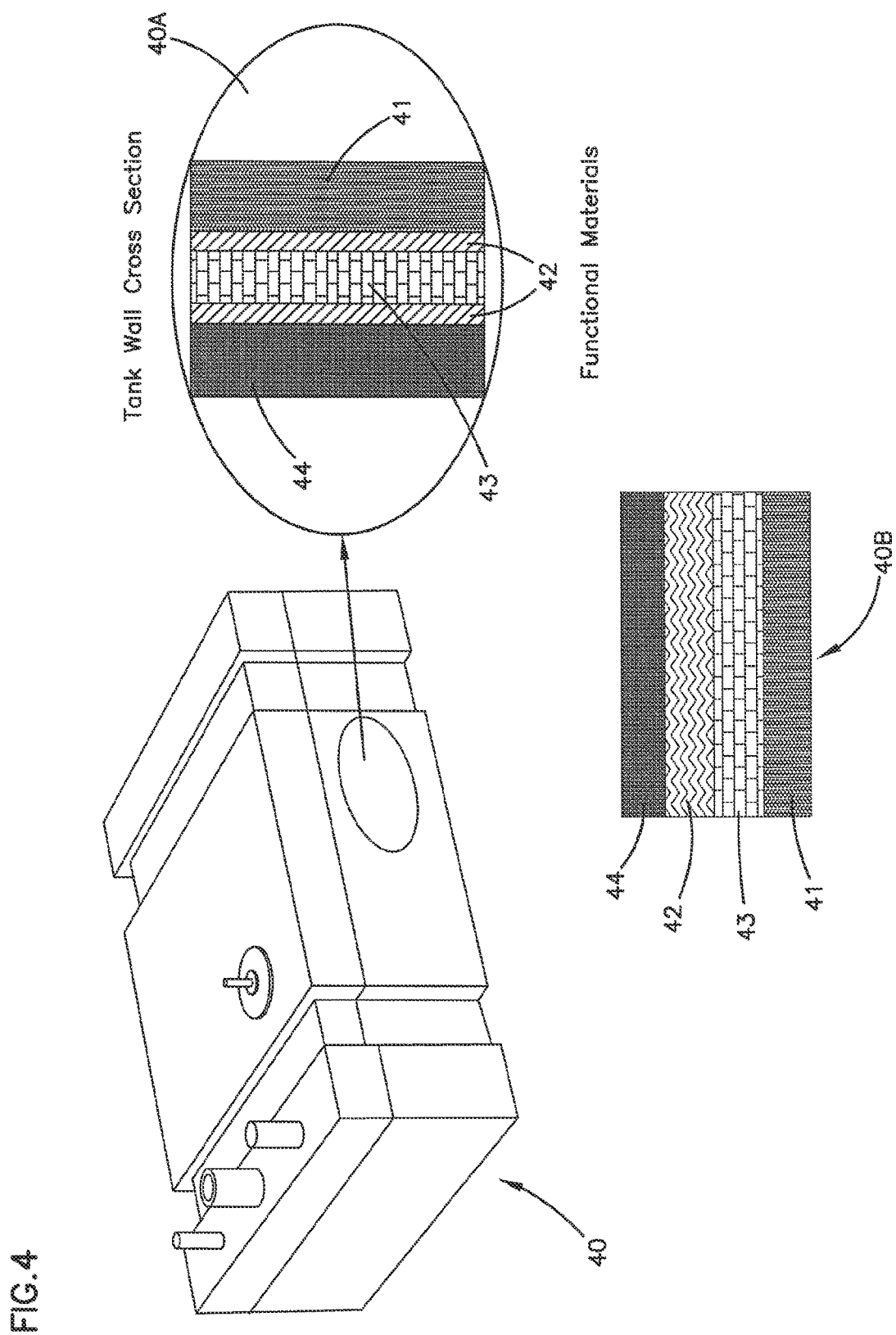

COMBINATION OF SUBSTITUTED CYCLODEXTRIN COMPOUND AND ACTIVATED CARBON

CROSS REFERENCE TO RELATED APPLICATIONS

This application is a continuation application of U.S. patent application Ser. No. 13/303,552, filed Nov. 23, 2011, which is a divisional application of U.S. patent application Ser. No. 12/033,649, filed Feb. 19, 2008, which claims priority from provisional application Ser. No. 60/890,707, filed Feb. 20, 2007, and which is incorporated herein by reference.

FIELD OF THE INVENTION

The invention relates to a composition that can prevent formation of or scavenge undesirable organics from contact with a polymer matrix. The invention relates to scavenging thermal decomposition products produced during melt processing from contaminants inherent in the composition and impurities from a polymer matrix that otherwise may elute into the air, a water supply, or an ingestible material such as a food, a drug, or a beverage. The invention is drawn to compositions for preventing the release of or scavenging volatile organic components; blends of polymers with the compositions of the invention; and articles made from the polymers having the compositions of the invention. The invention is further drawn to methods of making the compositions; methods of making the blends; and methods of making the articles.

BACKGROUND OF THE INVENTION

Synthetic polymer resins are used for a vast array of applications. In some applications, polymers can come into contact with or can be a source of undesirable organic materials that can be eluted into the atmosphere, a water supply, or an ingestible material inside a polymeric package. These organic materials may be formed by degradation of the polymer during processing, or may be the result of adding small molecules to the matrix, such as plasticizers or solvents. A polymer matrix may also absorb undesirable organic materials from external sources, or allow these materials to diffuse into the polymer package contents. Additionally, the barrier properties of a polymer may cause a buildup of undesirable organic materials inside packaging when, for example, foods inside begin to decay.

One industrially important polymer is polyethylene terephthalate (PET). PET packaging materials in the form of films, shaped containers, bottles, etc. have been known. Further, rigid, or semi-rigid, thermoplastic beverage containers have been made from preforms that are in turn molded from pellets or chips etc. Biaxially oriented blow molded thermoformed polyester beverage containers are disclosed in J. Agranoff (Ed) *Modern Plastics, Encyclopedia, Vol.* 16, No. 10A, P. (84) pp. 192-194. These beverage containers are typically made from a polyester, a product of a condensation polymerization. The polyester is typically made by reacting a dihydroxy compound and a diacid compound in a condensation reaction with a metallic catalyst. Dihydroxy compounds such as ethylene glycol, 1,4-butane diol, 1,4-cyclohexane diol and other diol can be copolymerized with an organic diacid compound or lower diester thereof such diacid. Such diacidic reactants include terephthalic acid, 2,6-naphthalene dicarboxylic acid, methyl diester thereof, etc. The condensation/polymerization reaction occurs between the dicarboxylic acid, or a dimethyl ester thereof and the glycol material in a heat driven metal catalyzed reaction that releases water or methanol as a reaction by-product leaving, a high molecular weight polyester material. Bulk resin is formed as a convenient flake, chip or pellet adapted for future thermal processing. Bulk polyester material can be injection blow molded directly into a container. Alternately, the polyester can be formed into an intermediate preform that can then be introduced into a blow-molding machine. The polyester is heated and blown to an appropriate shape and volume for a beverage container. The preform can be a single layer material, a bilayer or a multilayer preform.

Metallic catalysts are used to promote a polymerization reaction between diacid material and the dihydroxy compound. At the beginning of the melt phase, ethylene glycol, terephthalic acid, or ester thereof, and metallic catalysts are added to the reactor vessel. Various catalysts are known in the art to be suitable for the transesterification step. Salts of organic acids with bivalent metals (e.g. manganese, zinc, cobalt or calcium acetate) are preferably used as—direct esterification or trans-esterification catalysts, which in themselves also catalyze the polycondensation reaction. Antimony, germanium and titanium compounds are preferably used as polycondensate catalysts. Catalysts that may be used include organic and inorganic compounds of one or more metals alone or in combination with the above-described antimony, also including germanium and titanium. Suitable forms of antimony can be used, including inorganic antimony oxides, and organic compounds of antimony, such as antimony acetate, antimony oxalate, antimony glycoxide, antimony butoxide, and antimony dibutoxide. Antimony-containing compounds are currently in widespread commercial use as catalysts that provide a desirable combination of high reaction rate and low color formation. Titanium may be chosen from the group consisting of the following organic titanates and titanium complexes: titanium oxalate, titanium acetate, titanium butylate, titanium benzoate, titanium isoproprylate, and potassium titanyl oxalate. Organic titanates are not generally used in commercial production.

At the end of the melt phase, after polymerization is complete and molecular weight is maximized, the product is pelletized. The pellets are treated in solid-state polycondensation to increase intrinsic viscosity in order to obtain bottle resin of sufficient strength. The catalysts typically comprise metallic divalent or trivalent cations.

The treatment of polyester materials containing such catalysts can result in byproduct formation. Such byproduct can comprise reactive organic materials such as an aldehyde material, commonly analyzed as acetaldehyde. The formation of acetaldehyde materials can cause off odor or off taste in the beverage and can provide a yellowish cast to the plastic at high concentrations. Polyester manufacturers have added phosphorus-based additives as metal stabilizers to reduce acetaldehyde formation.

Many attempts to reduce aldehyde formation have also caused problems. Antimony present as $Sb^{+1}$, $Sb^{+2}$ and $Sb^{+3}$ in the polyester as catalyst residues from manufacture can be reduced to antimony metal, $Sb^0$, by the additives used to prevent aldehyde formation or scavenge such materials. Formation of metallic antimony can cause a gray or black appearance to the plastic from the dispersed, finely divided metallic residue.

The high molecular weight thermoplastic polyester can contain a large variety of relatively low molecular weight compound, (i.e.) a molecular weight substantially less than 500 grams per mole as a result of the catalytic mechanism discussed above or from other sources. These compounds can be extractable into food, water or the beverage within the container. These beverage extractable materials typically comprise impurities in feed streams of the diol or diacid used in making the polyester. Further, the extractable materials can comprise by-products of the polymerization reaction, the preform molding process or the thermoforming blow molding process. The extractable materials can comprise reaction byproduct materials including formaldehyde, formic acid, acetaldehyde, acetic acid, 1,4-dioxane, 2-methyl-1,3-dioxolane, and other organic reactive aldehyde, ketone and acid products. Further, the extractable materials can contain residual diester, diol or diacid materials including methanol, ethylene glycol, terephthalic acid, dimethyl terephthalic, 2,6-naphthalene dicarboxylic acid and esters or ethers thereof. Relatively low molecular weight (compared to the polyester resin) oligomeric linear or cyclic diesters, triesters or higher esters made by reacting one mole of ethylene glycol with one mole of terephthalic acid may be present. These relatively low molecular oligomers can comprise two or more moles of diol combined with two or more moles of diacid. Schiono, *Journal of Polymer Science: Polymer Chemistry Edition*, Vol. 17, pp. 4123-4127 (1979), John Wiley & Sons, Inc. discusses the separation and identification of PET impurities comprising poly(ethylene terephthalate) oligomers by gel permeation chromatography. Bartl et al., "Supercritical Fluid Extraction and Chromatography for the Determination of Oligomers and Poly(ethylene terephthalate) Films", *Analytical Chemistry*, Vol. 63, No. 20, Oct. 15, 1991, pp. 2371-2377, discusses experimental supercritical fluid procedures for separation and identification of a lower oligomer impurity from polyethylene terephthalate films.

Foods or beverages containing these soluble/extractables derived from the container, can have a perceived off-taste, a changed taste or even, in some cases, reduced taste when consumed by a sensitive consumer. The extractable compounds can add to or interfere with the perception of either an aroma note or a flavor note from the beverage material. Additionally, some substantial concern exists with respect to the toxicity or carcinogenicity of any organic material that can be extracted into beverages for human consumption.

The technology relating to compositions used in the manufacture of beverage containers is rich and varied. In large part, the technology is related to coated and uncoated polyolefin containers and to coated and uncoated polyester that reduce the permeability of gasses such as carbon dioxide and oxygen, thus increasing shelf life. The art also relates to manufacturing methods and to bottle shape and bottom configuration. Deaf et al., U.S. Pat. No. 5,330,808, teach the addition of a fluoroelastomer to a polyolefin bottle to introduce a glossy surface onto the bottle. Visioli et al., U.S. Pat. No. 5,350,788, teach methods for reducing odors in recycled plastics. Visioli et al. disclose the use of nitrogen compounds including polyalkylenimine and polyethylenimine to act as odor scavengers in polyethylene materials containing a large proportion of recycled polymer.

Wyeth et al., U.S. Pat. No. 3,733,309, show a blow molding machine that forms a layer of polyester that is blown in a blow mold. Addleman, U.S. Pat. No. 4,127,633, teaches polyethylene terephthalate preforms which are heated and coated with a polyvinylidene chloride copolymer latex that forms a vapor or gas barrier. Halek et al., U.S. Pat. No. 4,223,128, teach a process for preparing polyethylene terephthalate polymers useful in beverage containers. Bonnebat et al., U.S. Pat. No. 4,385,089, teach a process for preparing biaxially oriented, hollow thermoplastic shaped articles in bottles using a biaxial draw and blow molding technique. A preform is blow molded and then maintained in contact with hot walls of a mold to at least partially reduce internal residual stresses in the preform. The preform can be cooled and then blown to the proper size in a second blow molding operation. Gartland et al., U.S. Pat. No. 4,463,121, teach a polyethylene terephthalate polyolefin alloy having increased impact resistance, high temperature, dimensional stability and improved mold release. Ryder, U.S. Pat. No. 4,473,515, teaches an improved injection blow molding apparatus and method. In the method, a parison or preform is formed on a cooled rod from hot thermoplastic material. The preform is cooled and then transformed to a blow molding position. The parison is then stretched, biaxially oriented, cooled and removed from the device. Nilsson, U.S. Pat. No. 4,381,277, teaches a method for manufacturing a thermoplastic container comprising a laminated thermoplastic film from a preform. The preform has a thermoplastic layer and a barrier layer which is sufficiently transformed from a preformed shape and formed to a container. Jakobsen et al., U.S. Pat. No. 4,374,878, teach a tubular preform used to produce a container. The preform is converted into a bottle. Motill, U.S. Pat. No. 4,368,825; Howard Jr., U.S. Pat. No. 4,850,494; Chang, U.S. Pat. No. 4,342,398; Beck, U.S. Pat. No. 4,780,257; Krishnakumar et al., U.S. Pat. No. 4,334,627; Snyder et al., U.S. Pat. No. 4,318,489; and Krishnakumar et al., U.S. Pat. No. 4,108,324, each teach plastic containers or bottles having preferred shapes or self-supporting bottom configurations. Hirata, U.S. Pat. No. 4,370,368, teaches a plastic bottle comprising a thermoplastic comprising vinylidene chloride and an acrylic monomer and other vinyl monomers to obtain improved oxygen, moisture or water vapor barrier properties. The bottle can be made by casting aqueous latex in a bottle mold, drying the cast latex or coating a preform with the aqueous latex prior to bottle formation. Kuhfuss et al., U.S. Pat. No. 4,459,400, teach a poly(ester-amid) composition useful in a variety of applications including packaging materials. Maruhashi et al., U.S. Pat. No. 4,393,106, teach laminated or plastic containers and methods for manufacturing the container. The laminate comprises a moldable plastic material in a coating layer. Smith et al., U.S. Pat. No. 4,482,586, teach a multilayer of polyester article having good oxygen and carbon dioxide barrier properties containing a polyisophthalate polymer. Walles, U.S. Pat. Nos. 3,740,258 and 4,615,914, teach that plastic containers can be treated, to improve barrier properties to the passage of organic materials and gases, such as oxygen, by sulfonation of the plastic. Rule et al., U.S. Pat. No. 6,274,212, teaches scavenging acetaldehyde using scavenging compounds having adjacent to heteroatoms containing functional groups that can form five or six member bridge through condensation with acetaldehyde. Al-Malaika PCT WO 2000/66659 and Weigner et al., PCT WO 2001/00724 teach the use of polyol materials as acetaldehyde scavengers.

Further, we are aware that the polyester has been developed and formulated to have high burst resistance to resist pressure exerted on the walls of the container by carbonated beverages. Further, some substantial work has been done to improve the resistance of the polyester material to stress cracking during manufacturing, filling and storage. Modifications to the polyester material or formulation used in such an application should not compromise the structural integrity of the formed container.

Beverage manufacturers have long searched for improved barrier material. In larger part, this research effort was directed to carbon dioxide ($CO_2$) barriers, oxygen ($O_2$) barriers and water vapor ($H_2O$) barriers. More recently, original bottle manufacturers have had a significant increase in sensitivity to the presence of beverage extractable or beverage soluble materials in the resin or container. This work has been to improve the bulk plastic with polymer coatings or polymer laminates of less permeable polymer to decrease permeability.

Even with this substantial body of technology, substantial need has arisen to develop biaxially oriented thermoplastic polymer materials for beverage containers that can substantially reduce the elution of reactive organic materials into a food or beverage in the container or reduce the passage of permeants in the extractable materials that pass into beverages intended for human consumption.

Stabilization of polyester resins and absorption of reactive organics such as acetaldehyde have drawn significant attention. Proposals for resolving the problem have been posed. One proposal involves using active stabilizers including phosphor compounds and nitrogen heterocycles as shown in, for example, WO 9744376, EP 26713 and U.S. Pat. No. 5,874,517 and JP 57049620. Another proposal, which has received great attention, includes solid state polycondensation (SSP) processing. The materials after the second polymerization stage are treated with water or aliphatic alcohols to reduce residuals by decomposition. Acetaldehyde may also be scavenged with reactive chemical materials including low molecular weight partially aromatic polyamides based on xylylene diamine materials and low molecular weight aliphatic polyamides.

See, for example, U.S. Pat. Nos. 5,258,233, 6,042,908, and European Patent No. 0 714 832, commercial polyamides see WO9701427, polyethylene imine see U.S. Pat. No. 5,362,784, polyamides of terephthalic acid see WO9728218 and the use of inorganic absorbents such as zeolites, see U.S. Pat. No. 4,391,971.

Bagrodia, U.S. Pat. No. 6,042,908 uses polyester/polyamide blends to improve flavor of ozonated water. Hallock, U.S. Pat. No. 6,007,885, teaches oxygen-scavenging compositions in polymer materials. Ebner, U.S. Pat. No. 5,977,212, also teaches oxygen-scavenging materials in polymers. Rooney, U.S. Pat. No. 5,958,254, teaches oxygen scavengers without transitional catalysts for polymer materials. Speer, U.S. Pat. No. 5,942,297, teaches broad product absorbance to be combined with oxygen scavengers in polymer systems. Palomo, U.S. Pat. No. 5,814,714, teaches blended monoolefin/polyene interpolymers. Lastly, Visioli, U.S. Pat. No. 5,350,788, teaches method for reducing odors in recycled plastics.

Wood, et al. U.S. Pat. Nos. 5,837,339; 5,882,565; 5,883,161; 6,136,354 and other applications pending, teach the use of substituted cyclodextrin in polyester for barrier properties. Wood et al., U.S. Pat. No. 7,166,671 teach the use of a polymer grafted with cyclodextrin in polyolefins for barrier properties.

Activated carbons (CAS No. 7440-44-0) are porous synthetic solid materials that are commonly used in a wide variety of applications for purification, decolorization, and odor removal of gases and liquids. Activated carbon and in particular acid-washed activated carbon is a highly desirable material to entrain in a polymeric matrix for the purpose of scavenging undesirable organic molecules in gas and liquid phases, such as compounds formed during polymer processing as the products of thermal decomposition. In barrier layer applications, the inclusion of carbon would be desirable for the purpose of including scavenging properties for materials that would otherwise diffuse through the polymer matrix.

However, it is broadly understood that carbon particles are often not used in transparent polymer layers since they can be highly light scattering and can typically provide a black or gray cast to polymer layers. If large enough, individual particles can also be observed when the carbon is present in a clear medium, such as a water-white solvent or polymer matrix. Many ink formulations, for example, employ carbon black as the black pigment of choice. Automobile tires typically employ a large percentage of carbon black. The light scattering properties of carbon, while desirable in some applications, are not desirable where, for example, a clear, water-white, or an opaque or translucent white polymer matrix is desired.

Further, the presence of any particular particle in a polymer matrix can be deleterious to physical properties. Particles can have intimate and strong adhesion to the surrounding polymer matrix. The tensile strength of the polymer matrix typically increases, yet the elongation at break is decreased. Even where matrix-filler interactions are favorable, the resulting physical properties often reflect a lower strain at break than the matrix inherently possesses without the filler due to increased stress per unit of strain. This may be undesirable in certain applications, especially where the tensile properties of the polymer have been optimized without other materials being present. Further, it has been observed that the use of very small amounts of filler particles, such as 0.1 volume fraction or less of the total composition, is actually deleterious to the tensile strength and impact strength, in addition to lowering the elongation at break, where adhesion of the filler to the matrix is good. (For a discussion of this phenomenon see Nielsen, L. E., *Simple Theory of Stress-Strain Properties of Filled Polymers*, J. Appl. Pol. Sci. 10, 97-103 (1966).)

Where adhesion between the particle and the polymer matrix is minimal, elongation and other tensile properties of the polymer matrix may remain largely the same as the matrix without filler. However, as the matrix is stretched, the lack of adhesion between the particle and the polymer allows the filler to distort and concentrate the stress field by propagating a void around the particle in the direction of the stress. As the polymer breaks the void travels from one filler particle to the next and causes ultimate failure of the polymer.

Variations on these stress-strain behaviors can occur in the melt as well. Thus, a particle in a polymer melt may cause visual defects in the matrix even when particles are so small or used in such a small concentration as to be invisible to the naked eye. Voids may form in the direction of stress as a polymer is biaxially oriented, blowmolded, spun, or some other process that incurs stress to the polymer melt. These voids may be visible to the unassisted human eye as streaks, bubbles, and the like. The visible defects alone may be undesirable, or the defects may undesirable because they constitute weak spots in the polymer matrix, such that the physical properties of the polymer may be compromised in subsequent applications. For example, burst strength of the resulting polymer matrix may in insufficient because the defects cause failure of the matrix under relatively low pressures compared to the polymer without defects. Impact strength, tensile strength, and elongation at break can be similarly affected and may render a polymer matrix unusable for a given application.

Further, many fillers, including carbon, will tend to increase opacity of the otherwise clear, water white polyester. Inclusion of carbon as a filler will typically impart a gray cast, which is undesirable for certain applications e.g. beverage container bottles. However, Otto et al., U.S. Pat. No. 6,358,578, disclose the use of activated carbon in polyester matrixes, where an average particle size of 2 μm or less, preferably 500 nm or less, may be incorporated into polyester without producing discoloration. In that application, carbon particles are cocatalysts in transesterification reactions of the polyester. The carbon particles are milled prior to use in the polyester formulation in order to reduce the particle size. Physical properties of the resulting matrixes are not disclosed, nor are the presence of any structural defects or visual defects aside from discoloration.

Inclusion of activated carbon with cyclodextrin is found in other compositions of the prior art. For example, Nakazima, U.S. Pat. No. 5,001,176 disclose polyolefin compositions having a cyclodextrin and a dibenzylidenesorbitol-type compound. Carbon black is mentioned as an optional additive, but is not claimed. Andrews et al., U.S. Pat. No. 6,790,499 disclose a polyester composition having a polyhydric alcohol, which can be cyclodextrin. Eisenhart et al., U.S. Pat. No. 5,137,571 disclose the use of cyclodextrin as reversibly bound to water soluble polymers for the purpose of reversibly viscosifying aqueous systems. A formulation having carbon black is disclosed, but is not claimed. Nakamura et al., U.S. Pat. No. 5,854,320 disclose an ink composition containing cyclodextrin. Carbon black is disclosed in the specification as a pigment for a blank ink formulation. Similarly, Miyamoto et al., U.S. Pat. No. 6,827,767 and Suzuki et al., U.S. Pat. No. 6,849,111 disclose ink formulations having cyclodextrin and carbon black as a colorant. Woo et al., U.S. Pat. No. 6,833,342 disclose a non-polymeric deodorant composition having cyclodextrin, useful for carpet cleaning applications. Carbon is disclosed in a long list of optional potential additives, but is not claimed.

BRIEF DISCUSSION OF THE INVENTION

We have found a unique class of additives for blending with polymers that can act to prevent absorption, generation of, formation of or scavenge undesirable organics form the polymer materials. Alternatively, the additive can act as a barrier layer to prevent diffusion of organic small molecules through a polymer matrix. Finally, the additive can scavenge the byproducts of thermal processing, where degradation of materials can result in undesirable small molecule VOCs.

We have found that the combination of cyclodextrin and activated carbon particles is a desirable additive composition for inclusion into various polymer matrices. Surprisingly, the inclusion of carbon particles is highly beneficial, even when present at very low concentrations, when added along with cyclodextrin to aid and improve the scavenging properties of the cyclodextrin by increasing the amount of cyclodextrin free of a complex. By using low concentrations of small particles of activated carbon, we have found that the light scattering properties associated with carbon are not observed even for applications requiring a transparent and water-white finished product. Further, by using low concentrations of small particle size activated carbon, physical properties of the finished articles having both cyclodextrin and carbon particles is not significantly changed; the polymer matrix has substantially the same tensile strength, elongation at break, etc. as the polymer without the carbon particles.

The activated carbon complements the scavenging properties of cyclodextrin, enhancing scavenging of organic compounds such as organic acids in addition to the aldehyde scavenging properties of the cyclodextrin compound. The scavenging of organic acids is particularly beneficial because in subsequent thermal processing of polymers containing cyclodextrin, organic acids (e.g., formic, acetic and propanoic) can dehydrate the α-D-glucopyranose units within the cyclodextrin ring causing off-yellow color. Organic acids are a common impurity in many industrial grade resins, which previously presented a problem when the scavenging properties of cyclodextrin were desirably introduced into a thermoplastic article. This problem is obviated by the acid scavenging properties of the polymer additives of the present invention. Further, aldehyde scavenging is itself increased when both cyclodextrin compound and activated carbon are incorporated into a polymer matrix when compared to the scavenging of aldehyde by cyclodextrin compound alone.

The driving force for inclusion is mainly the substitution of the polar-apolar interaction between the apolar CD cavity and polar water, or apolar potential guest chemical and water. The driving force for inclusion is also apolar-apolar interactions between the guest and CD cavity. While this initial equilibrium to form the complex is very rapid (often within minutes), the final equilibrium can take much longer to reach. An equilibrium is established between dissociated and associated species, and is expressed by the complex stability constant, $K_a$ $$CD + D \rightleftharpoons CD \cdot D$$

$$K_{1:1} = \frac{[CD \cdot D]}{[CD][D]}$$

The guest can be displaced from the CD cavity under certain conditions and dissociation of the inclusion complex is a relatively rapid process. Different cyclodextrin pore size and derivative modification allows some control of the complex equilibrium. If the displaced guest is unable to find a CD molecules to reform the complex, the guest chemical can exists in the free volume of the polymer matrix. Because the equilibrium is dynamic, it further creates an opportunity for activated carbon to scavenge residual resin contaminants shifting the equilibrium to the right. Typical contaminant concentration in the polymer matrix are in the low parts per million or high parts per billion which favors and equilibrium shift to the right.

The additive compositions of the invention comprise, in their simplest form, a cyclodextrin and an activated carbon particle. Additive compositions may be formed by adding carbon to cyclodextrin; the addition is done either by dry-blending or in a solvent. The specific application and manufacturing process will dictate the specific solvent. The cyclodextrin may be an α-, β-, or γ-cyclodextrin or a mixture thereof. Preferably, the cyclodextrin compound utilized in the technology of the invention involves a substituted β- or α-cyclodextrin. Preferably the substituent on the cyclodextrin is methyl or acetyl. Preferred cyclodextrin materials and their use in polymer matrixes are described in Wood et al., U.S. Pat. Nos. 5,837,339; 5,882,565; 5,883,161; and U.S. Pat. Nos. 6,136,354; 6,709,746; 6,878,457; 6,974,603; and 7,018,712, which are incorporated herein by reference in their entirety.

Another preferred composition comprises cyclodextrin integrally incorporated into the backbone of a polymer or pendant on a polymer. Nonlimiting examples of such materials include Wood, et al., U.S. Pat. No. 7,166,671 which discloses a grafting reaction wherein cyclodextrin is reacted with e.g. maleic anhydride groups present along a polyolefin backbone. Iwao et al., JP 59227906 describe the reaction of a functionalized cyclodextrin with a high molecular weight carboxy ester group containing material. Masanobu, JP 05051402 describes the reaction of cyclodextrin with a halogen containing or other reactive compounds to form a cyclodextrin copolymer. Sidhu, et al., WO 93/05084 disclose an addition polymer containing cyclodextrin, wherein the cyclodextrin is reacted as β-cyclodextrinacrylate, among others. Szejtli, et al., U.S. Pat. Nos. 4,547,572 and 4,274,985 disclose various copolymers of cyclodextrin, including copolymers with epichlorohydrin, cellulose having pendant cyclodextrin groups attached by means of alkylene oxide polymers containing cyclodextrin, and polyvinyl alcohol copolymers. And Rohrbach, EP 0454910A1 disclose the crosslinking reaction of polyisocyanates with cyclodextrins. U.S. Patent Publication No. 2004/0110901, JP 59227906, JP 05051402, WO 93/05084, U.S. Pat. No. 4,547,572, U.S. Pat. No. 4,274,985, and EP 0454910A1 are incorporated herein by reference in their entirety. The current invention contemplates the use of any of these polymers in conjunction with activated carbon for incorporation into compositions, masterbatches, and final articles of the invention using any of the processes described herein as well as techniques that are known in the art of polymer processing.

Another preferred embodiment of the present invention comprises cyclodextrin attached to the surface of an article by coating the article with cyclodextrin and subjecting the coated article to an electron beam. This process is described in Yahiaoui et al., U.S. Pat. No. 6,613,703, which is incorporated herein by reference in its entirety. The current invention contemplates the treatment of articles coated with cyclodextrin in conjunction with activated carbon for electron beam treatment of final articles of the invention.

The cyclodextrin can be dissolved in solvent such that the concentration of cyclodextrin compound is from about 1.8 to about 60% by weight. The solution is then contacted with activated carbon such that the concentration of carbon is from about 0.001 to about 1.0% by weight. Preferably, the carbon has a pH in water from about 6 to 10 to avoid yellowing of the polymer matrixes in which the particles are incorporated. The ratio of carbon particles to cyclodextrin groups in the additive compositions of the invention can range from 1:1,000,000 to 20:1. Preferably the ratio of carbon to cyclodextrin is 1:2 to 1:40,000. The cyclodextrin and the carbon are mutually exclusive and do not appear to substantially penetrate into the interior pore or space of the cyclodextrin or into the porous nature of the carbon particle.

The solution can further be filtered using pore sizes of about 10 nm to about 100 μm. Using this means to control particle size, the activated carbon does not discolor the polymer matrix, a property commonly associated with carbon as a filler material. Alternatively, the solution can be centrifuged at about 500 to about 1000 rpm to remove larger particles. After solvent addition and filtration or centrifugation, the additive compositions may be dried prior to incorporating the additive composition to a masterbatch or final article of the present invention.

In some embodiments of the present invention, no solvents are employed and no filtration performed on the additive compositions. In these embodiments, a powder comprising the cyclodextrin and carbon can be admixed. The resulting powder blend can be added directly to an extrusion apparatus, where can be blended into a thermoplastic polymer. It is an advantage of these embodiments that no special milling or other preparations need be taken in order to provide the small particle sizes of carbon required to prevent large, visible particles from ending up in the final articles of the invention. Because of the high shear encountered in an extruder, especially where twin screw extrusion is employed, carbon with an average particle size of up to 100 μm may be employed as an additive. After incorporation by extrusion, the final particle size will be 10 μm or less.

The additive compositions may also be dispersed or dissolved in an oil for the purpose of delivering the additive composition to a masterbatch or a final article of the invention. Suitable oils include polyalphaolefin, paraffinic, aromatic, or naphthenic extender oils as well as silicone based oils. Such materials can be chosen to plasticize the polymer matrix but must function to at least suitably deliver the additive composition to a polymer matrix either in a single phase, i.e. a solution, or more than one phase, i.e. a dispersion or an emulsion.

In some embodiments of the present invention, a masterbatch having a high concentration of cyclodextrin and carbon in a thermoplastic resin can be formed. The masterbatch can advantageously be stored and used in a later process whereby the masterbatch is added to a polymer resin having no cyclodextrin or carbon. Preferably the addition is at a masterbatch-to-resin ratio of 1:1 to about 1:40, and is advantageously tailored to arrive at a desirable final concentration of cyclodextrin and carbon that depends on the targeted application. The masterbatch can be made by addition of an additive composition of the invention to a thermoplastic resin in an extruder. The additive composition may be delivered as a powder or in oil. After blending, the treated thermoplastic masterbatch resin is preferably pelletized for ease of storage. The masterbatch may also be made by surface coating chips or pellets of a thermoplastic resin with a solution having cyclodextrin and carbon and applying the solution using various spray coating apparatus known in the art of seed coating (e.g., fluidized beds, tumbling fluidized beds, rotary disk and rotating drum) and drying the pellets to provide a surface treated pellet or chip.

Masterbatches of the present invention contain cyclodextrin at about 100 to about 150,000 parts by weight per one million parts by weight of the masterbatch composition, more preferably about 100 to about 80,000 parts by weight per one million parts by weight of the masterbatch composition. The masterbatches contain carbon particles at about 0.005 to about 5000 parts by weight of per one million parts by weight of the masterbatch composition, more preferably about 0.05 to about 2000 parts by weight per one million parts by weight of the masterbatch composition. The ratio of carbon particles to cyclodextrin groups in the masterbatches of the invention can range from 1:1,000,000 to 20:1. Preferably the ratio of carbon to cyclodextrin is 1:2 to 1:40,000.

Articles having cyclodextrin and carbon can be formed by blending masterbatches having a relatively high proportion of cyclodextrin and carbon with untreated thermoplastic resin, and forming an article from the blend. Alternatively, an article can be made by extrusion blending an additive composition of the invention into a thermoplastic resin at the desired concentration. Articles of the invention may be formed using any commonly employed technique. Thermal processing is the preferred method to form articles of the invention. Thermal processing may be carried out by extrusion, coextrusion, profile extrusion, injection molding, blow molding, injection blow molding, electrospinning; spunbonding, meltblowing, uniaxial or biaxial orientation, or combinations thereof.

Additional materials may be incorporated into compositions containing cyclodextrin plus carbon particles. These materials may be incorporated into an additive composition, a masterbatch, or a final article of the present invention, depending on ease of incorporation and efficiency. Some nonlimiting examples of additional materials that may be incorporated include dyes, pigments, antioxidants, UV stabilizers, thermal stabilizers, bacteriocides, fungicides, fragrances, plasticizers, or tackifiers. These materials may be incorporated into a polymer matrix of the invention using any means known to the skilled artisan.

Preferably, the finished articles of the invention have 2000 ppm or less of activated carbon, more preferably about 0.001 to about 500 ppm, and most preferably 0.05 to 100 ppm of activated carbon particles based on the weight of the article. Preferably, the finished articles of the invention have about 10 to about 50,000 ppm of cyclodextrin, preferably 100 to 25,000 ppm cyclodextrin based on the weight of the finished article. The ratio of carbon particles to cyclodextrin groups in the articles of the invention can range from 1:1,000,000 to 20:1. Preferably the ratio of carbon to cyclodextrin is 1:2 to 1:40,000.

Notably, the activated carbon particles of the invention can range in size from 10 nm to 100 microns in the additive composition or the masterbatch compositions. It is contemplated that many embodiments of the invention will employ extrusion processing of the polymer matrixes having the additive compositions of the invention; where this is true, the particle size of the carbon in the additive composition or the masterbatch may be relatively large, e.g. 100 microns. It is contemplated that extrusion processing of polymers having the additive compositions of the invention causes large particles of carbon to be ground to smaller sizes due to the physical kneading, shearing, and mixing that takes place in a typical extrusion operation, especially twin-screw extrusion. Thus, the particle size of carbon in either the additive composition or in the masterbatch may be in the upper part of the 10 nm to 100 micron range.

In the final articles of the invention, however, it is preferable that the particle size of the activated carbon be no more than 1 micron, preferably 10 nm to 1 micron, more preferably 10 nm to 750 nm, still more preferably 10 nm to 500 nm, still more preferably 10 nm to 350 nm, still more preferably 10 nm to 250 nm, and most preferably 10 nm to 100 nm. Such carbon particles provide sufficient pore volume to effectively act in concert with cyclodextrin to scavenge undesirable compounds from polymer matrixes while having a small enough particle size that the user of a final article detects no gray cast and sees no individual particles.

The final articles of the invention may be made using a variety of techniques. In some embodiments, the final articles may be formed by adding the additive composition of the invention directly to an untreated polymer, and blending the two components before forming the final article. The additive composition may be delivered to the polymer matrix in a solvent or by melt blending, for example in an extruder. The additive compositions may be added to the polymer matrix as a powder, in a solvent, or in oil. Oil may be beneficially used to deliver the additive composition to the polymer matrix in melt blending, for example, as a plasticizer. Delivery of the additive composition in a solvent is most preferably used where solvent blending of the polymer and additive composition is contemplated. Blending is most preferably carried out using a twin screw extruder so as to achieve a uniformly blended final article composition.

The final articles of the invention are preferably made by melt blending of treated and untreated polymeric chips, wherein a treated polymeric chips are masterbatch materials as described above. Thus, a masterbatch chip having relative high levels of cyclodextrin and carbon can be melt blended with a second chip not having any of the additive composition, at a ratio such that the desired levels of cyclodextrin and carbon are realized after the two materials are blended together. The masterbatch chip may have been melt processed to blend the additive compositions of the invention therein, or the masterbatch chip may be surface coated with the additive composition. The melt blending may be carried out using any conventional melt blending technique, though it is preferably to employ twin screw extrusion to achieve a uniformly blended final article.

After blending in the additive composition, the final articles of the invention are formed using any known technique to shape and form a polymeric composition. For example, meltblowing of the compositions may be carried out to form a fiber. Other techniques to form fibers may be used, such as electrospinning; spunbonding, meltblowing, or combinations thereof. Additionally, the fibers may be formed as bicomponent fibers, wherein at least one component comprises cyclodextrin and activated carbon particles.

During extrusion operations where the additive composition of the invention is included, the cyclodextrin compound and activated carbon mixes with the melt polymer at high temperature during a set residence time. At the temperature of the melt extrusion, the cyclodextrin compound reacts with, complexes or associates with the metallic catalyst residues and prevents the production of catalytically generated reactive organic compounds, including aldehyde materials such as acetaldehyde. The activated carbon provides a further means of scavenging residual organic compounds, both in the melt and after the formed article is cooled.

Surprisingly, the activated carbon may be included with the cyclodextrin compound and subsequently melt processed to provide a clear and water-white finished molded polyester article, i.e. free of gray color commonly associated with activated carbon. The cyclodextrin compound and the activated carbon can also react with and/or scavenge volatile reactive materials such as acetaldehyde or organic acids that are present in the resin or that are formed during melt processing. A preform or blow molding residence time is selected that results in effective aldehyde concentration reduction but without cyclodextrin or polymer degradation. Such a reduction in aldehyde concentration reduces or eliminates major off-odors and off-flavors in the thermoplastic polymer.

Also surprisingly, we have found that the inclusion of activated carbon particles, when entrained in the polymer matrix in the manner described herein, do not result in any deleterious effects with respect to the physical properties of the polymeric matrix such as burst strength, elongation, or stress at break.

The final article may be a preform which is subsequently molded to form a final article. Such processing is preferably carried out when the final article is a three-dimensional shape such as a bottle, a cap, a closure, or a container formed from a polyester. The final article may also be a thick member which is subsequently stretched to form a thin film, such as by uniaxial or biaxial stretching to form a thin film from a thick film.

The final articles of the invention may be in any form where a polymer may be used. Thus, the final article of the invention may be an entity unto itself, such as a nonwoven filter, a bottle, or a windowpane. Alternatively, the final article may be a portion of an overall construction, for example, a nonwoven cover for an absorbent article, a single layer in a multilayer film construction, or a surface coating on a large article.

Nonlimiting examples of final articles include a container, a closure, a film, a coextruded film, a sheet, a liner, a semi-rigid member, a rigid member, a shaped member, a molded member, an embossed member, a porous member, a fiber, a yarn, a nonwoven fabric, a woven fabric, a coating on an article, a thin layer on top of an article, a thick layer on top of an article, a barrier layer, an injection molded article, a blow molded article, a rotomolded article, masterbatch pellets, an open-celled foam, a closed-cell foam, an adhesive article, an absorbent article, or a portion or a combination thereof.

A first aspect of the invention comprises a mixture of cyclodextrin and carbon particles as additive compositions. The cyclodextrin may be α, β, or γ-cyclodextrin. The cyclodextrin may be unsubstituted, substituted by a substituent such as methyl or acetyl, or may be covalently bound to a polymer. Where covalently bound to a polymer, the cyclodextrin may be integral to the polymer backbone, such as by reacting two hydroxyl groups of cyclodextrin with a diisocyanate to form a polyurethane, or by condensing cyclodextrin with a diacid to form a polyester. Alternatively, the cyclodextrin may be pendantly grafted to the polymer, such as by reacting a hydroxyl group of the cyclodextrin with a glycidyl group or an anhydride group present in the polymer backbone. The additive composition may be in powder form or may be in solvent or in an oil.

A second aspect of the invention is a method of making the additive compositions of the invention. The method may involve simply blending the two materials, blending them in solvent, blending in solvent followed by filtration and optionally removing the solvent after filtration, or extrusion blending of the cyclodextrin and carbon with a reactive polymer to graft the cyclodextrin to the polymer backbone.

A third aspect of the invention is a masterbatch pellet or chip having a thermoplastic polyester material and a relatively concentrated level of cyclodextrin and carbon. These high-concentration masterbatches are subsequently used in making a final article. The masterbatch pellet or chip can comprise a coated layer of the additive composition of the invention wherein the additive composition resides substantially on the exterior of the pellet or chip. Alternatively, the pellet or chip may be the result of melt blending, such as in an extruder, to incorporate the cyclodextrin and carbon. In these embodiments the additive composition will be substantially dispersed throughout the thermoplastic pellet or chip.

A fourth aspect of the invention is a method of making the masterbatch pellets or chips. They may be made by coating and drying preformed thermoplastic pellets or chips. Or the masterbatch pellets or chips may be melt blended, as in an extruder. In the latter case, the masterbatching method may also result in the covalent grafting of cyclodextrin with a thermoplastic polymer having a reactive site for grafting, such as an anhydride, chloride, or epoxy group pendant to the polymer chain.

A fourth aspect of the invention comprises a thermoplastic beverage container having the metal catalyst scavenger property and a volatile organic barrier property that results from the manufacture of the beverage container from the preform of the invention.

A fifth aspect of the invention comprises a final article comprising the desired endpoint levels of both carbon and cyclodextrin, wherein the cyclodextrin is either substituted with one or more moieties, or is covalently bonded to a polymer, or both. Also, in the final article, the carbon particle size is preferably no more than 500 nm in order to ensure that the particles are not visible in a white or clear polymer matrix, whereas in a masterbatch or additive composition it is not undesirable to have larger particles sizes. A wide range of final articles are envisioned, limited only by the bounds of all the generally useful shapes of thermoplastic polymers known in the art.

A sixth aspect of the invention is a method of making the final article having the desired endpoint levels and particle sizes of carbon and cyclodextrin. Generally, processing methods known in the art can be employed. The final articles may be made by blending masterbatch pellets or chips with a proportion of thermoplastic polymer pellets or chips in a thermal blending process such as extrusion. It may also be made by blending the additive compositions of the invention directly into a molten polymer, such as by addition during extrusion. In the latter application, the additive composition may be introduced as a powder or in oil. In a final step, the final articles are formed into a final shape. Such forming is limited only by the known art to shape polymers. Fine fibers and I-beams can be final articles of the present invention, as can many articles in between.

In the fifth and sixth aspects of the invention, the use of the purified cyclodextrin material having entrained activated carbon particles can result in a clear, substantially water white polymer matrix having little or no organic material to produce off odors or off flavors in the food material within a container formed from the polymer. Further, the polyester matrix suffers no structural defects of the type that often arise when particles are incorporated into a polymer matrix which is subsequently subjected to high strain, such as biaxial orientation or blow molding. Further, the barrier and scavenging properties imparted by the use of a cyclodextrin compound in conjunction with particles of activated carbon are superior to those found in the prior art.

BRIEF DESCRIPTION OF THE DRAWINGS

FIG. 4 depicts a fuel tank construction comprising a composition of the invention.

DETAILED DISCUSSION OF THE INVENTION

Figure 1A:
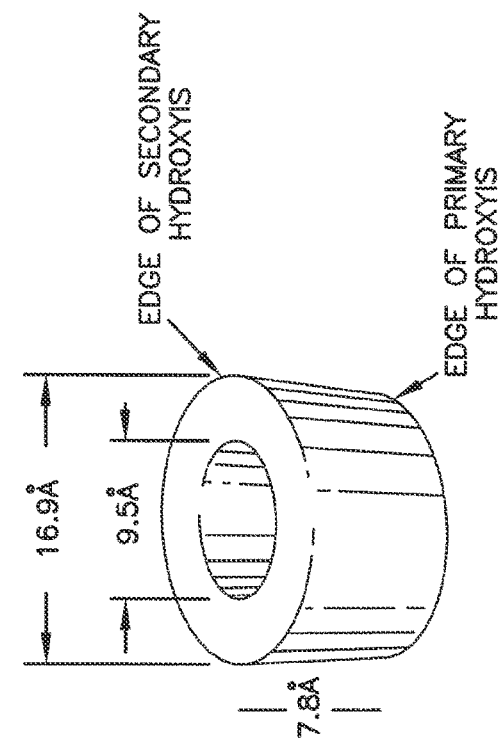
FIGS. 1A, 1B, 1C are schematic diagrams of cyclodextrin rings.

We have found that the scavenging properties of many polymeric materials can be substantially improved using a substituted cyclodextrin compound in conjunction with an amount of activated carbon at a concentration that can prevent the formation of an organic material such as an aldehyde, or scavenge formed organic material. We have further found that using a purified cyclodextrin material and an acid-washed carbon is preferred for polyester processing. We have further found that a concentration range of cyclodextrin compound in solution is preferred for contact with activated carbon. We have further found that a preferred degree of substitution, concentration of substituted cyclodextrin, particle size of activated carbon, concentration of activated carbon particles, and processing conditions produces a high-quality polyester matrix. We have found that combining a modified cyclodextrin material and activated carbon particles from the above mentioned purification process with the polymer matrix provides improved reactive organic compound properties and a reduced tendency to release polymer residue (e.g. acetaldehyde).

Polymeric Materials

In general, thermoplastic resins may be used with the additive compositions of the invention, wherein the compatibility of the cyclodextrin and carbon with the polymer matrix is the limiting factor. Non-limiting examples of useful thermoplastics include polyamides, polycarbonates, polyurethanes, polyethers, polyketones, polystyrene, polyacrylates, polyphenylene oxide, poly(vinyl chloride), or copolymers or blends thereof. More preferably, the thermoplastic polymer is a polyolefin or a polyester.

Polyolefins that are industrially useful include polyethylene, polypropylene, and copolymers thereof with various monomers including other olefins such as 1-butene, 1-hexene, 1-octene, and the like, or copolymers with other useful monomers such as vinyl acetate, vinyl chloride, vinylidene fluoride, acrylates, methacrylates, and the like. Any vinyl functional monomer can be copolymerized with ethylene or propylene to provide a useful olefin copolymer.

Suitable polyesters are produced from the reaction of a diacid or diester component comprising at least 60 mole percent terephthalic acid (TA) or $C_1$-$C_4$ dialkyl terephthalate, preferably at least 75 mole percent, and more preferably at least 85 mole percent; and a diol component comprising at least 60 mole percent ethylene glycol (EG), preferably at least 75 mole percent, and more preferably at least 85 mole percent. It is also preferred that the diacid component be TA, or the dialkyl terephthalate component be dimethyl terephthalate (DMT), and the diol component is EG. The mole percentage for all the diacids/dialkyl terephthalate components total 100 mole percent, and the mole percentage of all diol components total 100 mole percent.

Alternatively, suitable polyesters are produced from the reaction of a diacid or diester component comprising at least 60 mole percent 2,6-naphthalene dicarboxylic acid (NDA) or $C_1$-$C_4$ dialkyl napthalate, preferably at least 75 mole percent, and more preferably at least 85 mole percent; and a diol component comprising at least 60 mole percent ethylene glycol (EG), preferably at least 75 mole percent, and more preferably at least 85 mole percent.

Where the polyester components are modified by one or more diol components other than EG, suitable diol components of the described polyester can be selected from 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; and diols containing one or more oxygen atoms in the chain, for example diethylene glycol, triethylene glycol, dipropylene glycol, tripropylene glycol or mixtures of these and the like. In general, these diols contain 2 to 18, and preferably 2 to 8 carbon atoms. Cycloaliphatic diols can be employed in their cis or trans configuration or as mixtures of both forms.

Where the polyester components are modified by one or more acid components other than TA, suitable acid components of the linear polyesters may be selected from the class of isophthalic acid; 1,4-cyclohexanedicarboxylic acid; 1,3-cyclohexanedicarboxylic acid; succinic acid; glutaric acid; adipic acid; sebacic acid; 1,12-dodecanedioic acid; 2,6-naphthalene dicarboxylic acid; 2,7-naphthalene dicarboxylic acid, t-stilbene dicarboxylic acid, 4,4'-bibenzoic acid, or mixtures of these or their anhydride equivalents, and the like. In the case of polyethylene naphthalate, 2,6-naphthalene dicarboxylic acid can be used in place of the terephthalic acid listed above.

A typical PET based polymer for the beverage container industry has about 97 mole percent PET and 3 mole percent isophthalate—thus it is the copolymer polyethylene terephthalate/isophthalate. In the polymer preparation, it is often preferred to use a functional acid derivative thereof such as dimethyl, diethyl or dipropyl ester of a dicarboxylic acid. The anhydrides or acid halides of these acids may also be employed where practical. These acid modifiers generally retard the crystallization rate compare to terephthalic acid.

Conventional production of polyethylene terephthalate is well known in the art and comprises reacting terephthalic acid (TA) (or dimethyl terephthalate—DMT) with ethylene glycol (EG) at a temperature of approximately 200 to 250° C. forming monomer and water (monomer and methanol, when using DMT). Because the reaction is reversible, the water (or methanol) is continuously removed, thereby driving the reaction to the production of monomer. The monomer comprises primarily BHET (bishydroxyethylene terephthalate), some MHET (monohydroxyethylene terephthalate), and other oligomeric products and small amounts of unreacted raw materials. Subsequently, the BHET and MHET undergo a polycondensation reaction to form the polymer. During the reaction of the TA and EG it is not necessary to have a catalyst present. During the reaction of DMT and EG employing an ester interchange catalyst is required. Suitable ester interchange catalysts include compounds containing cobalt (Co), zinc (Zn), manganese (Mn), and magnesium (Mg), to name a few. Generally, during the polycondensation reaction the preferred catalyst is antimony in the form of an antimony salt or compound. Often bottle grade PET resin, during manufacture, is heated under inert ambient atmosphere to promote further polymerization in the resin or processed as an SSP resin. Typically bottle grade PET resin has an intrinsic viscosity (IV) of about 0.70 to about 0.85 dL/g.

Cyclodextrin

The solutions and thermoplastic materials of the invention contain a cyclodextrin compound that can comprise cyclodextrin or a cyclodextrin having one substituent group, preferably on a primary carbon atom. Such cyclodextrin materials have been shown to be compatible with thermoplastic polyester materials in scavenging and barrier properties. The cyclodextrin material can be added to the thermoplastic and, during melt processing, provide scavenging properties and barrier properties in the preform and in the final beverage container. The cyclodextrin materials, under good manufacturing conditions of time and temperature, are compatible, do not burn, and do not result in the formation of haze or reduced structural properties or clarity in the appearance of the polymer in the final container.

Cyclodextrin (CD) is a cyclic oligosaccharide consisting of at least five, preferably six, glucopyranose units joined by an $\alpha(1\rightarrow4)$ linkage. Although cyclodextrin with up to twelve glucose residues are known, the three most common homologs (α-cyclodextrin, β-cyclodextrin and γ-cyclodextrin) having 6, 7 and 8 residues are known and are useful in the invention.

Figure 1B:
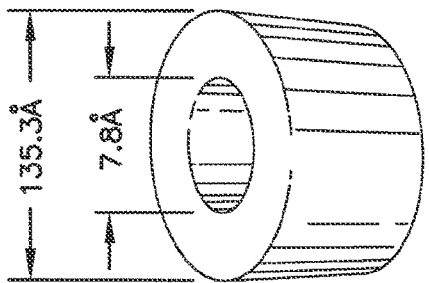
Figure 1C:
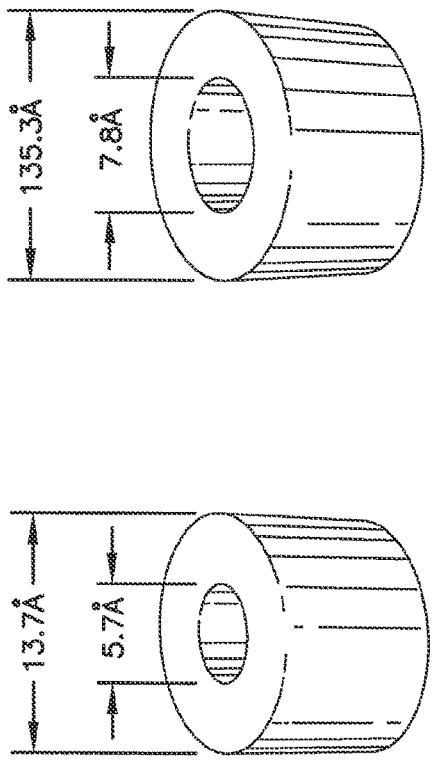

Cyclodextrin is produced by a highly selective enzymatic synthesis from starch or starch-like materials. They commonly consist of six, seven, or eight glucose monomers arranged in a donut shaped ring, which are denoted α, β and γ cyclodextrin respectively (See FIG. 1). The specific coupling of the glucose monomers gives the cyclodextrin a rigid, truncated conical molecular structure with a hollow interior of a specific volume. This internal cavity, which is apolar (i.e., is attractive to a wide range of hydrocarbon materials when compared to the hydrophilic exterior, is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex. These complexes are unusual in that only secondary bonding occurs between the CD and guest, yet their stability can be quite high depending on the characteristics of the cyclodextrin and guest. A metal-cyclodextrin assembly demonstrates all the basic bonding modes (non-specific Van der Waals bonds, hydrogen bonds and ligand-to-metal bonds) in a singular molecular system.

| Properties of CD | α-CD | β-CD | γ-CD |
| --- | --- | --- | --- |
| Degree of polymerization (n=) | 6 | 7 | 8 |
| Molecular Size (Å) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]^{25}_D$ | +150.5 | +162.5 | +177.4 |
| Color of iodine complex | Blue | Yellow | Yellow-Brown |
| Solubility in water (g/100 ml) 25° | | | |
| Distilled water | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The torus interior is hydrophobic due to the presence of methylene ($-CH_2-$) and ether ($-O-$) groups. The parent cyclodextrin molecule, and useful derivatives, can be represented by the following formula (the ring carbons show conventional numbering) in which the vacant bonds represent the balance of the cyclic molecule:

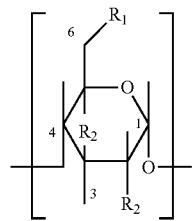

wherein n=6, 7 or 8 glucose moieties and $R_1$ and $R_2$ are primary or secondary hydroxyl or substituent groups (methoxy, acetyl, etc.), respectively. The cyclodextrin molecule shown above has —OH groups available for reaction at the 6-position (a primary group) and at the 3- and 2-positions (secondary groups). While the preferred cyclodextrin compound for use in aldehyde scavenging is a β-cyclodextrin, substituted cyclodextrins can be used to enhance barrier properties. The preferred cyclodextrin is substituted at one or more of the $R_1$ primary hydroxyls in the oligomer. Preferred cyclodextrins are first β-CD, then α-CD and are primarily substituted at the 6-position.

The preferred preparatory scheme for producing a derivatized cyclodextrin material having a functional group compatible with the thermoplastic polymer involves reactions at the primary hydroxyls with a minimum of the secondary hydroxyls of the cyclodextrin molecule being substituted. Coordination compounds or metal complexes in which the modified cyclodextrin acts as a ligand requires the secondary hydroxyl groups to be free of a derivative. A sufficient number of primary hydroxyls need to be modified to possess compatibility with the polymer and thermal stability in the process. Generally, we have found that a broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphato cyclodextrin, imidazoyl substituted cyclodextrin, pyridine substituted cyclodextrin, hydrocarbyl sulfur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well-known groups. The formation of such groups on either the primary or secondary ring hydroxyls of the cyclodextrin molecule involve well-known reactions. The acylation reaction can be conducted using the appropriate acid anhydride, acid chloride, and well-known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin, a cyclodextrin ether. Alkylating groups can be used to produce peralkylated cyclodextrin using sufficient reaction conditions to exhaustively react the available hydroxyl groups with the alkylating agent. Further, depending on the alkylating agent, the cyclodextrin molecule used in the reaction conditions can produce cyclodextrin substituted at less than all of the available hydroxyls. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant. The preferred cyclodextrin is a simple lower alkyl ether, such as methyl, ethyl, n-propyl, t-butyl, etc. and is not peralkylated but has a degree of substitution of about 0.3 to 1.8.

Tosyl(4-methylbenzene sulfonyl) mesyl (methane sulfonyl) or other related alkyl or aryl sulfonyl forming reagents can be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyls. The sulfonyl chloride is used at appropriate mole ratios depending on the number of target hydroxyl groups in the molecule requiring substitution. Either symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remains unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen-containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can be further reacted with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents. Halogen derivatives of cyclodextrins can be manufactured as a feed stock for the manufacture of a cyclodextrin molecule substituted with a compatibilizing derivative. In such compounds, the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphato groups. The 2, and 3, secondary hydroxyls can be branched using an alkyl phosphato group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxeme isomers, formyl methyl and its oxeme isomers, carbylmethoxy (—O—CH$_2$—CO$_2$H) and carbylmethoxymethyl ester (—O—CH$_2$CO$_2$—CH$_3$).

Cyclodextrin derivatives with compatibilizing functional groups containing silicone can be prepared. Silicone groups generally refer to groups with a single substituted silicon atom or a repeating silicone-oxygen backbone with substituent groups. Typically, a significant proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups, and can be further substituted with a variety of functional groups. For the purposes of this invention, the simple silicone containing substituent moieties are preferred including trimethylsilyl, mixed methylphenyl silyl groups, etc. We are aware that certain β-CD and acetylated and hydroxy alkyl derivatives are available commercially.

Preferably, the cyclodextrin compound utilized in the technology of the invention involves a modified or substituted β- or α-cyclodextrin. Preferred cyclodextrin materials are substituted substantially on the 6-OH of the glucose moiety in the cyclodextrin ring. The free hydroxyl groups at the 3- and 2-position of the glucose moieties in the cyclodextrin ring are important for metallic catalyst complex formation. The degree of substitution (D.S.) of the cyclodextrin material can range from about 0.3 to 2.5 or 0.3 to 2; preferably the degree of substitution can range from about 0.5 to 1.8. Further the degree of substitution has an important role in ensuring that the cyclodextrin is compatible with the polymer melt, but is not so substituted that the cyclodextrin cannot participate in complexing catalyst residues. We have further found that the amount of substituted cyclodextrin material useful in preventing the formation of aldehyde by complexing metallic catalyst residues is less than the amount of cyclodextrin typically used in barrier structures for volatile organic compounds. The effective amount of a substituted cyclodextrin for aldehyde suppression ranges from about 100 ppm to 1400 ppm based on the polymer composition as a whole, preferably 350 ppm to 900 ppm. We believe the mechanistic action of the substituted cyclodextrin material is one or more of the secondary hydroxyl groups form a coordination complex with the catalyst residues to form a metallocyclodextrin where more than one metal ion is bound per cyclodextrin. While the amounts of cyclodextrin useful in preventing formation of organic residuals during preform and bottle manufacture are less and that used in barrier applications, even at reduced amounts, the cyclodextrin materials can provide a degree of barrier properties. According to the concentrations disclosed in this application, regenerated acetaldehyde formation is substantially reduced in the polyester and some degree of barrier property is achieved. To achieve these results, a substantial and effective fraction of the cyclodextrin must be available for catalyst residue complexation to accomplish the goal of the invention. The compatible cyclodextrin compounds are introduced into the melt thermoplastic substantially free of an inclusion complex or inclusion compound.

Cyclodextrin Bonded to a Polymer

Grafting cyclodextrin to a polymer backbone to form pendant cyclodextrin groups is known in the art. Wood, et al., U.S. Pat. No. 7,166,671, previously incorporated by reference in its entirety, disclose a grafting reaction wherein cyclodextrin is reacted with e.g. maleic anhydride groups present along a polyolefin backbone. Cyclodextrins useful in the grafting reaction can be unsubstituted or can have one or more substituent groups, such as O-methyl or O-acetyl. Grafting is typically carried out using any of thermal processing techniques known to the skilled artisan. For example, a Plastograph® mixer, available from the Brabender® GmbH and Co. KG of Duisburg, West Germany, may be used to melt a polymer and incorporate cyclodextrin and carbon. In most cases an extruder will be used to blend a polymer and cyclodextrin with carbon to form a grafted cyclodextrin. Twin screw or single screw extrusion may be used.

| Twin screw Parameters | Value |
|---|---|
| Rate (lbs./hr.) | 30 |
| RPM | 400 |
| Torque | 38 |
| Reaction Zone Temp. (° C.) | 25 |
| Die Melt Temp. (° C.) | 207 |
| CD Moisture | 0.5 |
| Resonce, First (sec) | 30 |
| Cleared out (sec) | 90 |
| SME (kj/kg) | 873 |

Extruders used to blend the additive compositions can be, for example, a single screw extruder, such as a single screw extruder available from the Davis-Standard Co. of Pawcatuck, N.J. Alternatively, a custom single screw extruder and/or custom screws for a single screw extruder may be employed. Such equipment is available from The Madison Group, Madison, Wis. In some processes, a co- and counter rotating twin screw extruder may be used to extrude compositions of the inventions. Such equipment is available from e.g. Coperion (Krupp Warner Pfleiderer). of Ramsey, N.J., American Leistritz Extruder Corp, of Somerville, N.J., Berstorff Corp., of Florence, Ky., Haake Thermo Fisher Scientific, of Waltham, Mass. and CW Brabender Instruments, of S. Hackensack, N.J.

An alternative to grafting is to incorporate cyclodextrin integrally into a polymer backbone by employing cyclodextrin as a monomer in a polymerization reaction, specifically the hydroxyl groups on cyclodextrin as reactive moieties in a polymerization reaction. Using hydroxyl groups, addition polymers such as polyesters and polyurethanes are easily made. For example, U.S. Patent Publication No. 2004/0110901, JP 59227906, JP 05051402, WO 93/05084, U.S. Pat. No. 4,547,572, U.S. Pat. No. 4,274,985, and EP 0454910A1, previously incorporated herein by reference, describe various methods of incorporating cyclodextrin into a polymer. Additionally, U.S. Pat. No. 6,613,703, also previously incorporated by reference, discloses a method of attaching cyclodextrin to a polymer via electron beam.

Activated Carbon

Activated carbons (CAS No. 7440-44-0) are porous synthetic solid materials that are commonly used in a wide variety of applications for purification, decolorization, and odor removal of gases and liquids. Activated carbons are used generally in particulate form and available in powder and granular forms. They are characterized by an open, porous structure that provides a large surface area, which in turn facilitates adsorption of a variety of chemicals. The ability of the activated carbon to scavenge compounds is directly related to the inner surface area of the particles.

In commercially available activated carbons (typically called charcoal), the inner surface area is typically 500-1500 $m^2/g$ as measured by employing the method of Brunauer, Emmett, and Teller's (BET) nitrogen adsorption isotherm. (S. Brunauer, P. H. Emmett and E. Teller, *J. Am. Chem. Soc.*, 1938, 60, 309.) Total surface area and pore volume/structure are critical parameters when specific uses of activated carbon are contemplated. Pore volume limits the size of molecules that can be absorbed, while the total surface area dictates the total amount of materials that may be absorbed.

Pore sizes in activated carbons are categorized as micropores, which are up to 2 nm, mesopores, which are between 2 and 50 nm, and macropores, which are greater than 50 nm. The role of macropores is principally that of a passage into the interior of the carbon particle; these pores do not contribute greatly to the overall surface area of the particle or effectively entrap molecules. Micropores are principally the place where adsorption of chemicals takes place.

The original source of the carbon, as well as the means to activate the carbon, determines the pore size distribution. In theory, any substance containing carbon may be used as a starting material. Materials are activated either by chemical or gas activation at temperatures between 400° C.-1000° C. Wood, sawdust, and peat are most often treated by chemical activation. Gas activation most often employs an initial carbonizing (i.e. burning) step. Thus, wood charcoal, nut shell charcoal, bituminous coals, and coke from brown coal or peat are typical materials used for gas activation. Gas activation of coconut shell charcoal provides a high proportion of micropores; gas activation of soft wood charcoal provides a greater proportion of macropores. Chemical activation is considered the most useful in general to provide for large proportions of both micropores and mesopores. Combinations of gas and chemical activation are also used.

Chemical activation, most typically accomplished with zinc chloride and phosphoric acid, relies on dehydrating action of these chemicals on starting materials that commonly include non-carbonized (unburned) peat or sawdust. After contacting the chemical to the carbonaceous starting material, temperatures of 400° C.-1000° C. cause the opening up of pores. After heating the chemicals are removed by extraction to provide the finished product having the same macroscopic form as the starting material.

Gas activation most typically employs gases containing oxygen. Thus, steam or carbon dioxide are contacted with the starting material at temperatures of 800° C.-1000° C. to result in a partially decomposed particle wherein the absence of the decomposed materials form the pores.

Activated carbon has several important uses including solution purification of organic compounds; removal of tastes and odors from domestic and industrial water supplies, wastewater, vegetable and animal fats and oils, alcoholic beverages, chemicals, and pharmaceuticals; waste water treatment; purification of gases; liquid phase recovery; separation processes; and as a support for catalysts. Many organic compounds such as chlorinated solvents, non-chlorinated solvents, gasoline, pesticides and trihalomethanes can be adsorbed by activated carbon. It is also effective for removal of chlorine gas and moderately effective for removal of some heavy metals.

Particularly preferable in certain applications is acid-washed carbon. Removal of deleterious organic compounds is more effective at pH of less than 7. See DeSilva, F. J., "The Issue of pH Adjustment in Acid-Washed Carbons", *Water Conditioning and Purification*, May 2001, pp. 40-44. A carbon that causes pH to rise above 7 at the outset may not be effective at removal of organics until several rinses in water result in a lower pH. Any activated carbon that is not acid-washed usually produces an initial effluent in water having a pH of greater than 7. The actual initial pH depends on several factors, including ash content in the starting material. Initial pH can be as high as 10.5 when the carbon is immersed in water. Washing the carbon in acid creates a lower initial pH after rinsing the acidifying agent from the carbon, providing for improved uptake of organic VOC and other deleterious compounds.

Purification of Cyclodextrin and Entraining Activated Carbon Particles

We have found that, purifying the cyclodextrin compounds described above, cyclodextrin impurities can be effectively removing using purification techniques including contacting the aqueous cyclodextrin solution with activated charcoal or activated carbon absorbent. We found that using these techniques reduced the concentration of impurities in the aqueous cyclodextrin solutions to levels that do not contribute to color generation in the polyester material, form undesirable organic materials or reduce antimony.

Cyclodextrin may also be purified using nanofiltration techniques. In nanofiltration or reverse osmosis processing, the aqueous cyclodextrin material is directed into the appropriate purification equipment and is maintained, at an appropriate pressure, for appropriate period of time to ensure that a substantial proportion of the impurity in the cyclodextrin material passes through the filter or reverse osmosis membrane while the cyclodextrin material is retained in the reject aqueous solution. In this regard, about 700 to 1,200 liters of solution are passed through the equipment per square meter of filter or membrane and a rate of about 125 to 2,000 liters of solution per hour. The effluent passing through the filter or membrane comprises about 60 to 98% of the input stream. Typically, the nanofiltration or reverse osmosis equipment is operated at an internal pressure of about 125 to 600 psi.

Decolorizing resins like Dowex SD-2 (a tertiary amine functionalized macroporous styrene divinylbenzene copolymer) are used to remove PET yellow-color causing materials from aqueous cyclodextrin solutions. Other resins like Dowex Monosphere 77 (a weak base anion resin), Dowex MAC-3 (a weak cation resin), and Dowex 88 (a strong acid cation) can also be used in combination (infront) with Dowex SD-2. These resins can be operated with flow of 2 to 25 liters per minute per ft$^2$ of resin.

The purified cyclodextrin may also be purified by simply adding activated carbon to the cyclodextrin in a solvent, and filtering off the carbon after a suitable period to allow for the carbon to adsorb impurities. We have further found that, in certain ranges of cyclodextrin concentration, an amount of the activated carbon adsorbent remains in the cyclodextrin solution after the bulk activated carbon from the purification process is filtered away from the solution. In such a purification processes, the aqueous cyclodextrin solution is prepared at concentration of about 1.5 to about 50 wt. percent of the cyclodextrin compound in the aqueous solution. Such an aqueous solution is then contacted with the carbon absorbent at about 10 to 350 liters solutions per kilogram of absorbent. The residence time of the solution in contact with the absorbent can be adjusted to obtain substantial impurities removal. The solution, however, is generally maintained in contact with the absorbent for a time period of about 0.5 to 24 hours.

After the contact period, the solution is filtered using filters having pore sizes from about 0.1 to about 20 μm. Microfiltration used to remove particles on the order of 10 micron or less in size. The objective of the filtration step of the process is the removal of particulate matter and/or undissolved solids having a size of from about 0.1 to 1.0 microns, preferably from about 0.2 to 5 microns, from the liquid. Examples of suitable membrane types include ceramic, porous carbon, and polymeric. Suitable membranes and membrane filtration apparatus are available from TAMI, Pall, WACO, Filtros Techsep, Ceramem, Koch and GE Osmonics. The filtration preferably takes place at a temperature of about 50-80° C.

Additionally, an amount of carbon can simply be added to purified cyclodextrin after any of the purifying steps outlined above. This method allows for the maximum levels of uncomplexed carbon pores, which in turn results in the most available carbon pore space for impurity scavenging in the end applications of the invention.

The following is a method for evaluating dried additive compositions for thermal stability based upon the potential of generating off-color. This method mimics the processing of injection molding cyclodextrin coated PET chip. Approximately 1.5 mL (approx. 1.7 g) of a 35 wt.-% cyclodextrin solution having entrained activated carbon particles at 0.2 wt % is placed into a 20 mL headspace vial (or equivalent).

Water is evaporated from the solution by heating the vial using a laboratory hot plate (or equivalent) at a moderate temperature. The vial is periodically agitated during heating, and the interior of the vial is swabbed with a lint free wipe to remove condensate. When the residue becomes viscous and begins to bubble the vial is removed from the heat and gently rolled to coat the interior walls of the vial evenly. The coated vial is placed into an oven at 60° C. for approximately 10 minutes to completely solidify the residue by removing all remaining water. The clear residue may bubble and haze slightly when evaporation is complete. The vial is removed when dry and placed into a 280° C. oven for exactly 2 minutes. If oven temperature drops when placing the vial into the oven, begin timing only when the oven temperature is >270° C. The vial is removed and allowed to cool to room temperature. The heat treated residue is dissolved in 5 mL of deionized water, the liquid is transferred to a syringe and filtered through a 0.22 μm syringe filter. The filtrated is analyzed by a visible wavelength spectrophotometer at 570 nm. Acceptable residue should remain colorless to just slightly off yellow.

The above purification, solution, and filtration techniques apply to unsubstituted or substituted α-, β, or γ-cyclodextrin. After purification of cyclodextrin, the cyclodextrin may be grafted to a polymer to form one embodiment of the additive compositions of the invention. Carbon is typically added after, or contemporaneously with, the grafting reaction.

Masterbatches of Additive Compositions and Polymer

The cyclodextrin compound can be incorporated onto the chip or pellet by coating the chip or pellet or similar structure with a liquid coating composition containing an effective amount of the cyclodextrin, substituted cyclodextrin, or polymer reacted cyclodextrin, plus activated carbon. Such coating compositions are typically formed using a liquid medium. Liquid media can include aqueous media or organic solvent media. Aqueous media are typically formed by combining water with additives or other components to form coatable aqueous dispersions or solutions. Solvent based dispersions are based on organic solvents and can be made using known corresponding solvent based coating technology. The liquid coating compositions of the invention can be contacted with a thermoplastic pellet (also called "chip" or "flake") using any common coating technology including flood coating, spray coating, fluidized bed coating, electrostatic coating or any other coating process that can load the pellet with sufficient cyclodextrin and carbon to act as a scavenger or barrier material in the final article when the masterbatch is blended with untreated polymer pellets. Careful control of the amount and thickness of the ultimate coating optimizes the scavenger and barrier properties without waste of material, maintains clarity and color in the thermoplastic bottle and optimizes polyester physical properties. The coatings are commonly applied to the pellet and the liquid carrier portion of the solution or dispersion is removed typically by heating leaving a dry coating on the pellet. When dry, substantially no solution or liquid medium is left on the pellet. Commonly, the coated pellets are dried in a desiccant-dryer to remove trace amounts of residual solvent before thermal processing. Typically, pellets are dried to 50 ppm or less of solvent.

Alternatively, masterbatch compositions of the invention may be formed by extrusion blending thermoplastic polymer with cyclodextrin, substituted cyclodextrin, or polymer bonded cyclodextrin and carbon particles. This method typically employs the additive blend in the form of a powder. The powder is typically an admixture of cyclodextrin or substituted cyclodextrin and carbon, though it may be dried after filtration or centrifugation of a solution of the additive as described above. The powder is metered into an extruder so as to contact the thermoplastic resin that is in a molten state. The extrusion may be a simple blending process, or it may be a means to induce grafting of cyclodextrin or substituted cyclodextrin onto the polymer backbone. Such grafting reactions are described in U.S. Pat. No. 7,166,671, previously incorporated by reference in its entirety.

After extrusion blending, the masterbatch composition is pelletized for convenient storage. Pelletizing typically involves extruding the masterbatch in the form of a strand, passing the strand through a temperature controlled water bath to cool the strand, passing the strand through a strand cutter to form the pellet, and drying the water from the pellet prior to storing.

Articles Containing the Additive Compositions

Articles of the present invention may be made by any technique commonly employed in the art to blend thermoplastic materials and shape them into a final form. Most advantageously, articles of the invention can be formed by extrusion blending thermoplastic polymer with cyclodextrin, substituted cyclodextrin, or polymer bonded cyclodextrin and carbon particles, followed by a thermal forming process.

Extrusion blending typically employs the additive blend in the form of a powder. The powder is typically an admixture of cyclodextrin or substituted cyclodextrin and carbon, though it may be dried after filtration or centrifugation of a solution of the additive as described above. The powder is metered into an extruder so as to contact the thermoplastic resin that is in a molten state. The extrusion may be a simple blending process, or it may be a means to induce grafting of cyclodextrin or substituted cyclodextrin onto the polymer backbone. Such grafting reactions are described in U.S. Pat. No. 7,166,671, previously incorporated by reference in its entirety.

Extrusion blending may also be used to blend masterbatch pellets with untreated thermoplastic pellets. The masterbatch pellets may be surface coated or extrusion blended, as is described above. The two types of pellets are metered into an extruder to provide the desired end concentration of cyclodextrin groups and carbon particles in the finished article.

After extrusion blending, a final article is formed from the molten blend of thermoplastic resin, cyclodextrin, and carbon particles. Commonly employed techniques of forming a final article include extrusion, coextrusion, profile extrusion, injection molding, blow molding, injection blow molding, electrospinning; spunbonding, meltblowing, uniaxial or biaxial orientation, or combinations thereof. Additionally, specialized techniques may be employed to provide certain articles, wherein one or more components of the article comprise cyclodextrin and activated carbon. For example, a bicomponent fiber may be made using a polyolefin having grafted cyclodextrin and carbon particles as one component and a second resin, such as polyester, as second component. Bicomponent fibers and methods of making them are disclosed in Krueger et al., U.S. Pat. No. 4,795,668, which is incorporated herein in its entirety.

In another example of a specialized technique used to make a final article of the invention, injection blow molding processes are used to produce polyester bottles. Two manufacturing techniques are typically used. In one method, a preform is made by injection molding techniques in a preform shape having the neck and screw-cap portion of the bottle in approximately useful size but having the body of the preform in a closed tubular form substantially smaller than the final bottle shape. A single component or multi-layered perform can be used. The preform is then inserted into a blow-molding machine where it is heated enough to allow the preform to be inflated and blown into the appropriate shape. Alternatively, the resin can be injection blow molded over a steel-core rod. The neck of the bottle is formed with the proper shaped received closures (cap) and resin is provided around the temperature-conditioned rod for the blowing step. The rod with the resin is indexed into the mold and the resin is blown away from the rod against the mold walls. The resin cools while in contact with the mold forming the transparent bottle. The finished bottle is ejected and the rod is moved again in the injection molding station. This process is favored for single cylindrical bottles.

The most common machine involves a four station apparatus that can inject resin, blow the resin into the appropriate shape, strip the formed container from the rod and recondition the core rod prior to the repeat of the process. Such containers are typically manufactured with the closure fitment portion comprising a threaded neck adapted to a metal screw cap. The bottle bottom typically has a lobed design such as a four-lobe or five-lobe design to permit the bottle to be placed in a stable upright position. The manufacturing equipment has been continually upgraded to add blowing stations and increased throughput.

Raw material used in any of the thermoforming procedures is a chip form or a pelletized thermoplastic polyester. The thermoplastic polyester is made in the form of a melt and is converted to bulk polymer. The melt can be easily reduced to a useful pellet or other small diameter chip, flake or particulate. The pellet, chip, flake or particulate polyester can then be blended with the derivatized cyclodextrin material until uniform, dried to remove moisture, and then melt extruded under conditions that obtain a uniform dispersion or solution of the modified or derivatized cyclodextrin and polyester material. The resulting polyester pellet is typically substantially clear, uniform and of conventional dimensions. The pellet preferably contains about 0.01 to about 0.14 wt-% of the cyclodextrin compound, more preferably about 0.035 to about 0.09 wt-% of the cyclodextrin compound, polyester pellet containing the modified cyclodextrin material can then be incorporated into the conventional preform or parison with injection molding techniques. The products of these techniques contain similar proportions of materials.

Care must be taken during the manufacture of the preform or parison and the final manufacture of the container. During the manufacture of the perform and later during the manufacture of the container, sufficient heat history in terms of maintaining the melt polymer at a set temperature for a sufficient amount of time to obtain adequate scavenging and to thoroughly disperse the cyclodextrin material in the polymer matrix must be achieved. However, the time and temperature of the steps should not be so long as the cyclodextrin material can thermally decompose (i.e., ring open the cyclodextrin) resulting in a loss of scavenging capacity and barrier properties accompanied by polymer yellowing. Polymer haze can result during stretch blow molding unless a cyclodextrin derivative with a melting point below the preform reheat temperature is selected. Cyclodextrins with melting points greater than the preform reheat temperature will produce microvoids in the biaxially oriented bottle wall giving a hazy appearance to the polymer. Accordingly, depending on the equipment involved, the thermoplastic polyester is maintained in a melt form at a temperature greater than about 260° C., preferably about 270° C. to 290° C. for a total residence time greater than about 90 seconds preferably about 120±30 seconds to ensure adequate metal residue complexation during injection molding while ensuring that the cyclodextrin material prevents acetaldehyde generation. The total residence time is determined from the cycle time of the injection molding machine.

Figure 2:
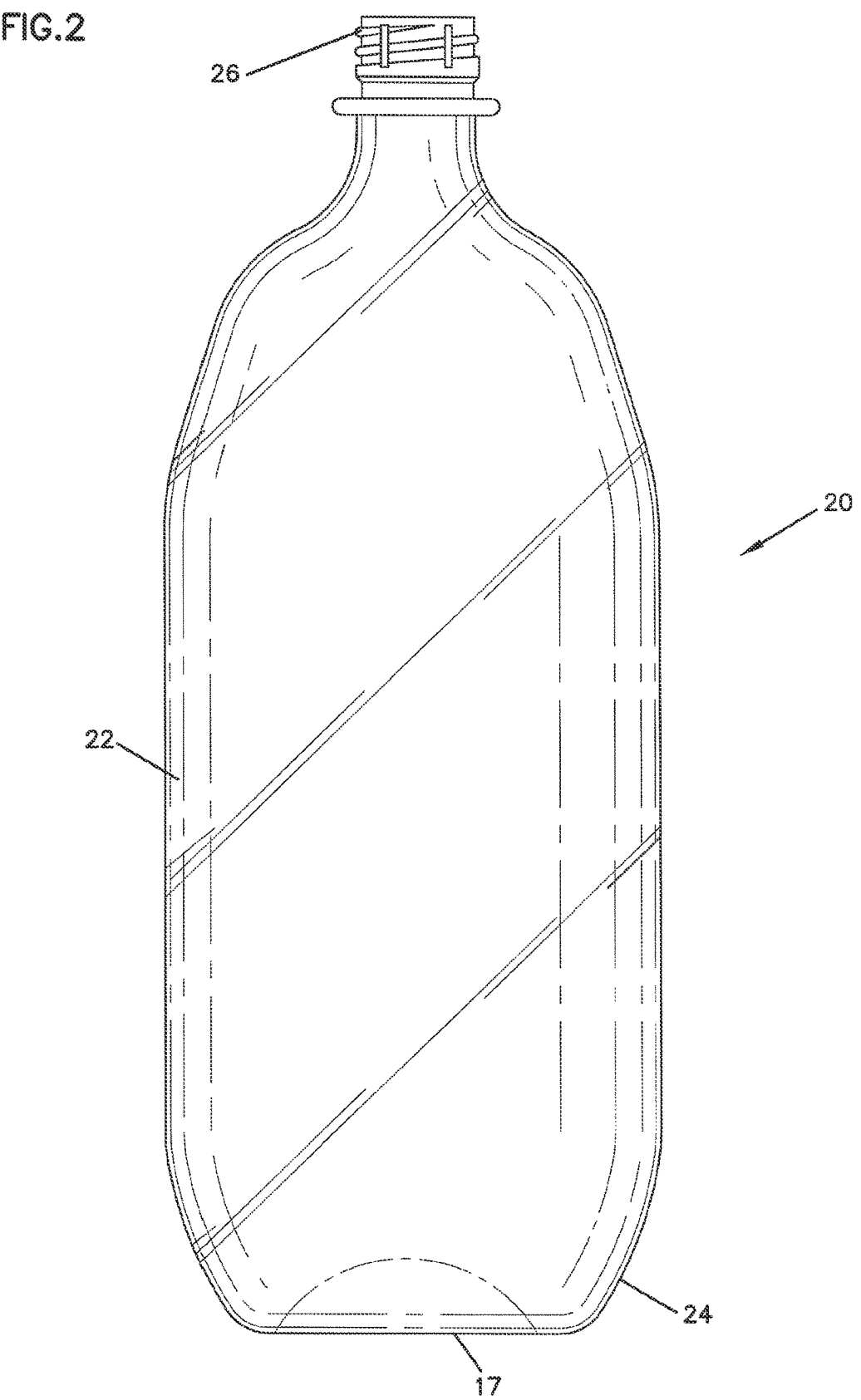
FIG. 2 depicts a container comprising a composition of the invention.

Turning to FIG. 2, the container generally shown at 20 comprises a body 22, a base 24 and a cap portion 26. The overall shape of the container is formed in a thermoplastic blow molding operation. Base 24 is a self-supporting base formed during bottle manufacture. Such a bottle can contain either a second layer 17, prepared from a parison having a second thermoplastic material formed during parison formation or can have a second layer 17 derived from a liquid coating material. The liquid coating material can be either a parison coating or a bottle coating.

Other preferred embodiments of the present invention are absorbent articles, wherein one or more films, sheets, or nonwoven layers are present and can advantageously incorporate the compositions of the invention. Thermoplastic polyolefins are known to be used as components of absorbent articles. Where they are employed, cyclodextrin and carbon of the disclosure can be incorporated to scavenge undesirable odor-causing chemicals. By an effective amount it is meant, for example, that at least 10% of trained odor-sensing test subjects will notice a reduction in the odor emanating from the absorbent article or component of the absorbent article, or at least 30%, or at least 50%, or even at least 70% of the trained test subjects when compared to an article free of a cyclodextrin and carbon composition.

In some embodiments, a cloth-like or reinforcing backsheet layer can be generally made up, for example, of polypropylene spunbond nonwoven produced in a manner known to those skilled in the art. By replacing a portion of the normal polypropylene polymer used in the spunbond process with an effective amount of the polypropylene grafted cyclodextrin and carbon of the disclosure, effective reduction of odors emanating from the absorbent article can be achieved. Alternatively, instead of polypropylene, the nonwoven can comprise copolymers of ethylene and α-octene, methyl acrylate, or ethyl acrylate. The nonwoven may incorporate grafted cyclodextrin, substituted cyclodextrin, or unsubstituted cyclodextrin along with activated carbon. Any fiber, filament, or fabric containing thermoplastic polyolefins used for this purpose can have incorporated therein cyclodextrin and activated carbon of the disclosure.

Figure 3:
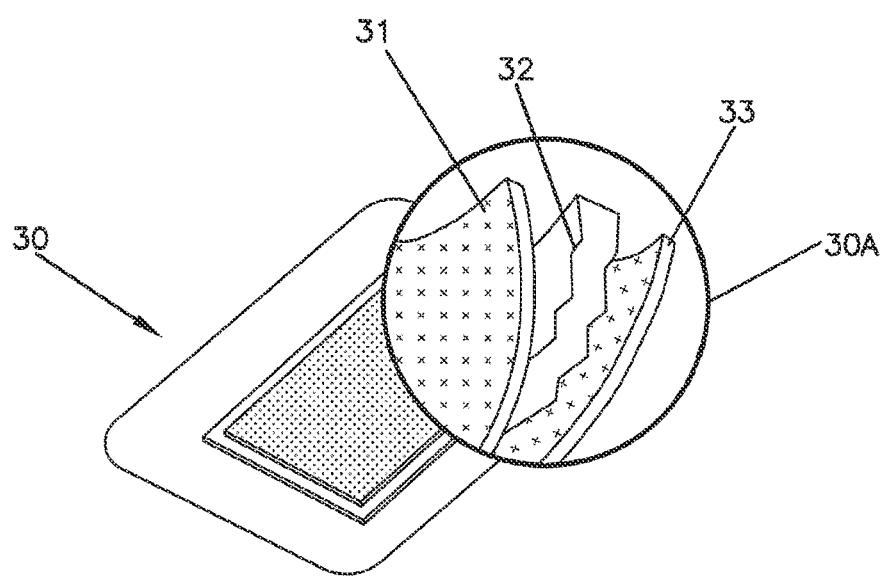
FIG. 3 depicts an absorbent pad comprising a composition of the invention.

For example, FIG. 3 shows a food absorbent pad 30 having spunbond or porous top film 31 and spunbond or porous bottom film 33 and meltblown or absorbent core 32. Such an absorbent article may be used in the meat packing industry by placing the pad underneath uncooked meat in a sealed package. Film 31, film 33 or core 32 may comprise a composition of the invention, for example a blend of substituted cyclodextrin and activated carbon, to improve the scavenging of malodorous compounds by the absorbent article.

Another useful embodiment of the present invention is a fuel tank wherein a cyclodextrin and carbon composition of the present invention may be incorporated. The five-layer coextruded fuel tank is the de facto industry standard in North America. Coextruded tanks are designed to meet strict evaporative fuel standards and consist of an inner layer of HDPE joined by a tie layer and barrier layer of polyimide (nylon) or ethylene-vinyl alcohol (EVOH) copolymer. The tie layer is an adhesive resin formed by the copolymerization or graft polymerization of HDPE with maleic acid, and has a functional group which adheres to a polyethylene chain polymer. An additional tie layer can be joined by a layer of "regrind" and an outer layer of HDPE. The use of the "regrind" layer adds an additional layer for a six-layer tank wall. In one embodiment of the invention, the polymers and articles of the disclosure can be used to substantially improve the barrier properties of commercial thermoplastic fuel tanks by adding activated carbon to a functionalized HDPE resin grafted with cyclodextrin as the inner or optionally the outer HDPE layer composition of the fuel tank to, for example, reduce gasoline vapor permeation.

Thus, in embodiments the present disclosure provides an organic liquid and vapor impermeable vessel comprising a rigid structure having layers in the following order:

an outer polymer layer, such as an HDPE layer;
a barrier resin layer, such as Nylon or EVOH;
an adhesive resin layer; and
an inner polymer layer comprising a blend of a polyolefin and a modified polyolefin and activated carbon, the modified polyolefin comprising a cyclodextrin, the cyclodextrin being substantially free of a compound in its central pore, for example, an HDPE layer in admixture with activated carbon and a functionalized polymer resin grafted with cyclodextrin.

FIG. 4 shows a multilayered fuel tank construction 40 commonly used in the industry. Schematic diagram of one embodiment of the multilayered construction, 40A, shows outside HDPE layer 41, adhesive resin layer 42, barrier resin layer 43, another adhesive layer 42, and an inside HDPE layer 44. A second embodiment of the multilayered construction, 40B, shows outside HDPE layer 41, adhesive resin layer 42, barrier resin layer 43, an inside HDPE layer 44. The barrier resin layer is most commonly ethylene-vinyl alcohol copolymer or nylon. In any of these layers, a cyclodextrin and carbon composition of the invention may be incorporated. For example, one or both HDPE layers may be grafted with cyclodextrin and incorporate carbon. Alternatively, a barrier or adhesive layer can incorporate cyclodextrin, for example a substituted cyclodextrin, and carbon particles. Inclusion of the compositions of the invention are advantageous to prevent fuel fumes from breaching the tank and creating a flammability hazard.

We have also found the combination of cyclodextrin and activated carbon is important in achieving the goals of the invention. As discussed above, the cyclodextrin material is applied to a pellet or chip in the form of an aqueous solution. Such solutions are made by dissolving or suspending the cyclodextrin material in an aqueous medium. The aqueous solution is prepared from cyclodextrin materials where the trace impurities have been removed. These impurities can arise from the enzymatic manufacture of the cyclodextrin material producing linear starches, saccharide and polysaccharide precursor materials or from the synthetic reaction between the cyclodextrin material and reactants used to form the derivatives. Materials that are present as impurities in the substituted cyclodextrin material that cause off-yellow color in injection molded PET include iron, sodium chloride, acetic acid, iron acetate, sodium acetate, furfurals, linear starches and sugars, dehydrated linear starches, levoglucosan, levoglucosenone and proteins.

The foregoing discussion illustrates various embodiments of the application and the acetaldehyde reduction and the barrier and complexing properties of the materials of the invention. The following examples and data further exemplify the invention and contain a best mode.

EXPERIMENTAL SECTION

Example 1

A 35 wt.-% methyl beta cyclodextrin (degree of substitution 1.0, manufactured by Wacker-Chemie of Adrian, Mich.) solution was prepared in deionized water. Prior to preparing the solution, 0.10 wt % of coconut charcoal previously ground in a mortar and pestle was blended into the dry cyclodextrin (16 hours @100° C.). The 35 wt % methyl beta cyclodextrin solution containing activated carbon was centrifuged at 750 rpm for 30 minutes. An upper aliquot of the centrifuged solution was added to a glass slide and then covered with a slip slide. Gray scale (8 bit) digital images were then taken of the solution using a transmitted light microscope (Olympus BH2, available from Olympus America Inc. of Melville, N.Y.) with a 40× objective equipped with a 4 megapixel eyepiece camera. Six pictures were taken of the sample. A reference photograph was taken of a stage micrometer for dimensional calibration. The images were analyzed by Optimas image analysis software (available from the X Company of Y): a variable threshold was used, a binary fill operation was performed, and the data from each image was extracted. The information extracted was the area equivalent diameter (AED). The results were obtained by analyzing the data using the statistical package R.

Figure 5A:
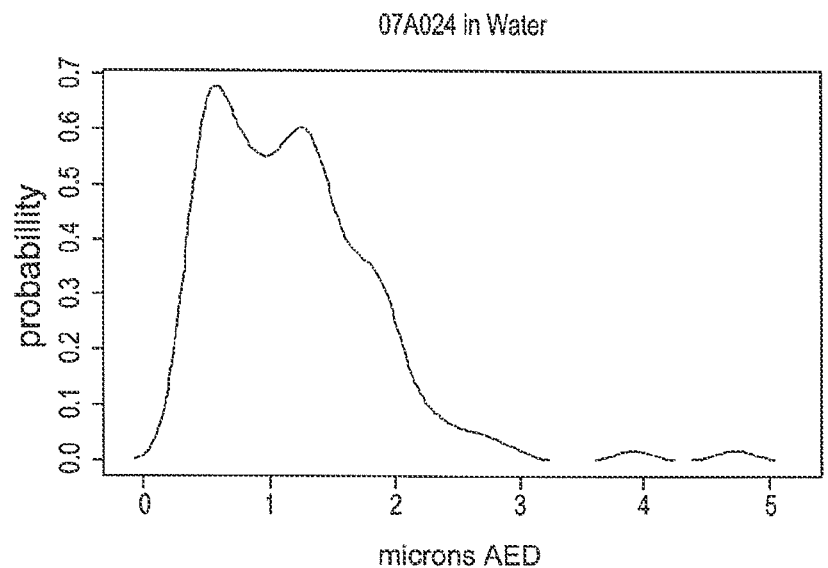
FIGS. 5A, 5B are plots showing carbon particle distribution in for a compositions of the invention.
Figure 5B:
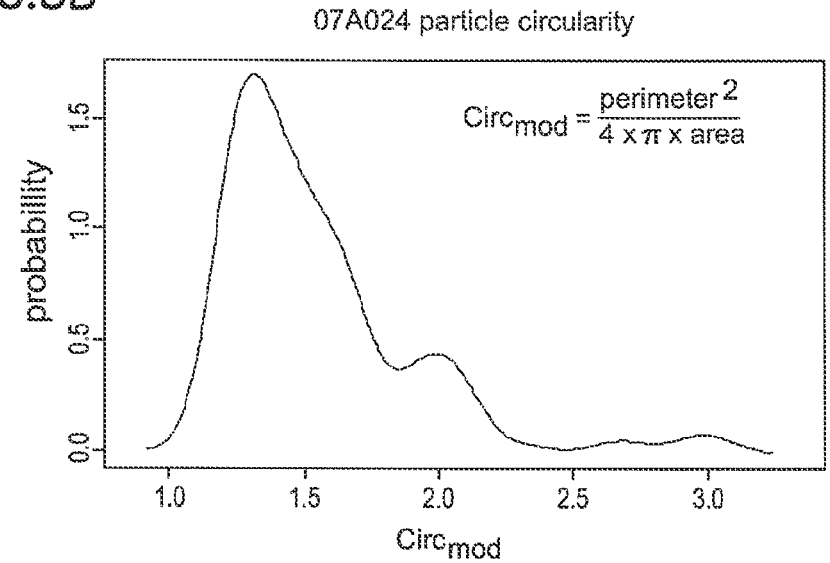

FIG. 5 illustrates AED in microns and particle circularity in microns for the carbon particle distribution in 35 wt.-% methyl beta cyclodextrin solution centrifuged at 750 rpm for 30 minutes. The area equivalent diameter and the particle circularity were calculated from the area and perimeter of the image of the particle. The particle circularity is the value obtained by dividing the square of the perimeter of a circle of equivalent area to the captured particle image by $4\pi$ multiplied by the area of the captured particle image. The particle circularity is 1 when the captured particle image is a perfect circle, and is less than 1 when the captured particle image is oblong or has unevenness. For example, the particle circularity of an equilateral hexagon is 0.952, an equilateral pentagon is 0.930, that of an equilateral tetragon is 0.886, and an equilateral triangle is 0.777. FIGS. 5A and 5B show that the particle size is less than about 2 microns or less than about 1 micron.

Example 2

Emery 3004 synthetic hydrocarbon oil manufactured by Cognis Corporation, Cincinnati, Ohio was infused with 0.20 wt % of coconut charcoal previously ground in a mortar and pestle. The oil with activated carbon dispersion was centrifuged at 750 rpm for 30 minutes. An upper aliquot of the centrifuged oil was added to a glass slide and then covered with a slip slide. Gray scale (8 bit) digital images were then taken of the oil using an Olympus BH2 transmitted light microscope equipped with a 40× objective and a 4 megapixel eyepiece camera. Two pictures were taken of the sample. A reference photograph was taken of a stage micrometer for dimensional calibration. The images were analyzed by Optimas image analysis software: a variable threshold was used, a binary fill operation was performed, and the data from each image was extracted. The information extracted was the area equivalent diameter (AED). The results were obtained by analyzing the data using the statistical package R.

Figure 6A:
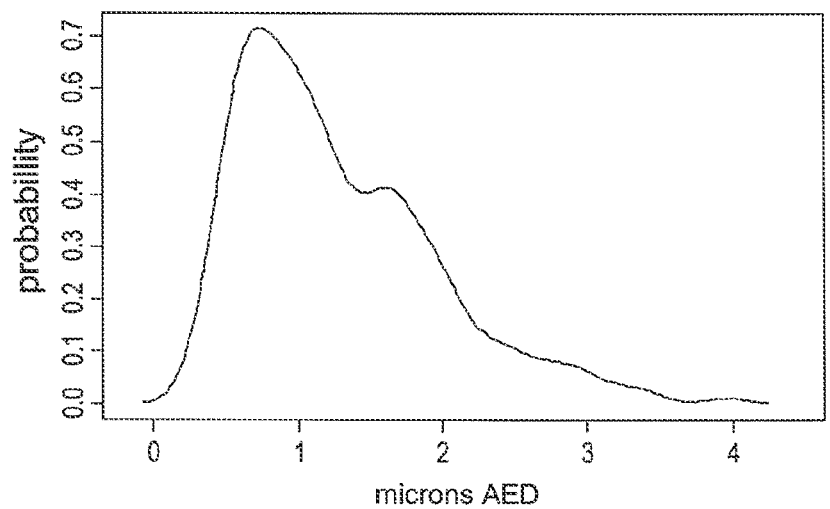
FIGS. 6A, 6B are plots showing carbon particle distribution in another composition of the invention.
Figure 6B:
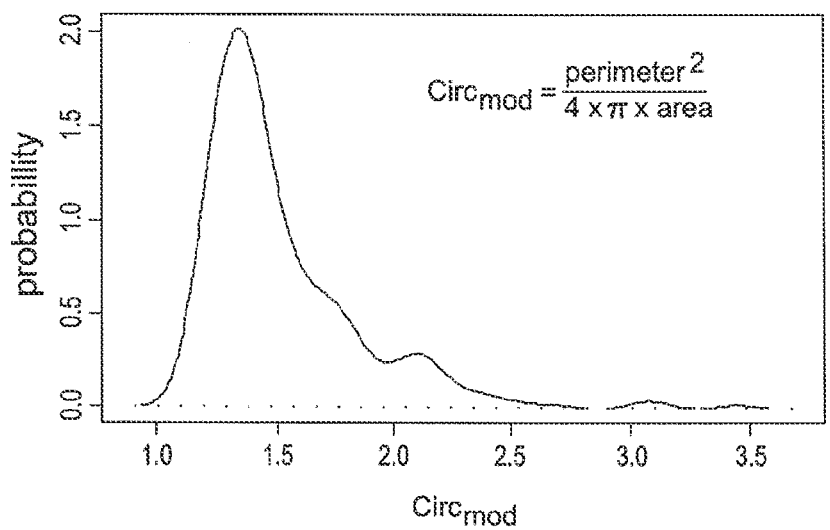

FIG. 6 is carbon particle distribution in Emery 3004 oil centrifuged at 750 rpm for 30 minutes. The area equivalent diameter and the particle circularity are calculated from the area and perimeter of the image of the particle.

Example 3

Dried β-cyclodextrin was analyzed for thermal stability based upon the potential of generating volatile thermal decomposition products produced from impurities including acetic acid, formic acid, furfurals, linear starches and sugars, dehydrated linear starches, levoglucosan, levoglucosenone and proteins. This method mimics the processing of reactive extrusion where β-cyclodextrin is grafted onto maleic anhydride functionalized polyolefins, and any subsequent conversion of the material to form an article. β-Cyclodextrin (manufactured by Wacker-Chemie of Adrian, Mich.) was prepared by dry blending 0.01, 0.10 and 1.0 wt % of coconut charcoal previously ground in a mortar with dry cyclodextrin (16 hours @100° C.). β-cyclodextrin, 0.5 grams was added to a 40 mL headspace vial (available from IChem® Corp. of) with a Teflon-faced septa screw cap. The vial with screw cap removed was heated in an oven to 290° C. for exactly 2 minutes. The vial was removed from the oven and allowed to cool at room temperature for 40 seconds before applying the Teflon-faced septa screw cap. Thermal decomposition products resulting from β-cyclodextrin impurities were measured in the headspace inside the sealed vial by gas chromatography.

High-resolution gas chromatography (HRGC) operated with flame ionization detection (FID) was used to measure the headspace concentration of volatile thermal decomposition products. Volatile compounds in the headspace were quantitatively collected by solid phase microextraction (SPME) from the test vial and analyzed by HRGC/FID. The 40-mL vial was maintained at 40° C. for 15 minutes prior to sampling the headspace. The headspace was sampled for 10 minutes using an 85 μm Carboxen/PDMS StableFlex® SPME fiber (Supleco, Inc. of Bellefonte, Pa.) and the SPME fiber analyzed according to the GC method in Table 1.

TABLE 1

Gas chromatography conditions.
HP 5890 GC

| | Setpoint | |
|---|---|---|
| Zone Temperatures: | | |
| Injector | 250° C. | |
| Detector (FID) | 330° C. | |
| Over Zone: | | |
| Equib Time | 3.00 min. | |
| Oven Program: | | |
| Initial Temp.: | 75° C. | |
| Initial Time: | 2.00 min. | |
| Level | Rate (° C./min.) | Final Temp. (° C.) | Final Time (min) |
| 1 | 10.0 | 125 | 0.00 |
| 2 | 25.0 | 220 | 0.00 |
| 3 | 35.0 | 260 | 1.00 |

Runtime (min): 12.9
Injection: split
Split Flow: 30 mL/min
Column linear velocity: 4.21 cm/sec
Column: Rtx-5 60 m × 0.32 mm × 0.25 μm Table 2 provides the gas chromatographic results obtained from the four β-cyclodextrin samples. All activated charcoal containing samples showed substantial reduction of decomposition volatiles.

TABLE 2

Gas chromatograph SPME headspace results of β cyclodextrin powder, dried to remove water, and heated to 290° C. for 2 minutes.

| Activated Charcoal Wt.-% | Gas Chromatography Area Counts | Percent (%) Reduction in Thermal Decomposition Products |
|---|---|---|
| 0 | 12,228 | NA |
| 0.01 | 4,373 | 64.2 |

TABLE 2-continued

Gas chromatograph SPME headspace results of β cyclodextrin powder, dried to remove water, and heated to 290° C. for 2 minutes.

| Activated Charcoal Wt.-% | Gas Chromatography Area Counts | Percent (%) Reduction in Thermal Decomposition Products |
|---|---|---|
| 0.10 | 2,879 | 76.5 |
| 1.0 | 1,087 | 91.1 |

Example 4

Methyl β-cyclodextrin was analyzed for thermal stability based upon the potential of generating volatile thermal decomposition products produced from impurities including include acetic acid, formic acid, furfurals, linear starches and sugars, dehydrated linear starches, levoglucosan, levoglucosenone and proteins. This method mimics the processing of injection molding cyclodextrin coated PET chip. A 35 wt % methyl β-cyclodextrin (degree of substitution 1.0, manufactured by Wacker-Chemie of Adrian, Mich.) solution was prepared by adding β-cyclodextrin to deionized water. Prior to preparing the solution, 0.01, 0.10 and 1.0 wt % of coconut charcoal previously ground in a mortar and pestle was blended into the dry cyclodextrin (16 hours @100° C.). Each of the three 35 wt % methyl beta cyclodextrin and activated charcoal solutions were centrifuged at 750 rpm for 30 minutes. An upper aliquot of the centrifuged solution, approximately 1.5 mL (1.7 g) of a 35 wt % cyclodextrin solution, was added into a 40-mL headspace vial with a Teflon-faced septa screw cap. Water was evaporated from the solution by heating the vial using a heat gun at a moderate temperature and gently rolling to coat the interior walls of the vial evenly while purging with dry nitrogen. The coated vial placed into an oven at 75° C. for approximately 10 minutes to completely solidify the cyclodextrin residue by removing all remaining water. In some cases, the clear β-cyclodextrin residue bubbled and hazed slightly when evaporation was complete. The vial with screw cap removed was heated in an oven to 290° C. for 2 minutes. The vial was removed and allowed to cool at room temperature for 40 seconds before applying the Teflon-faced septa screw cap. Thermal decomposition products resulting from methyl β-cyclodextrin impurities were measured in the headspace inside the sealed vial by gas chromatography using the parameters of Table 1.

Figure 7:
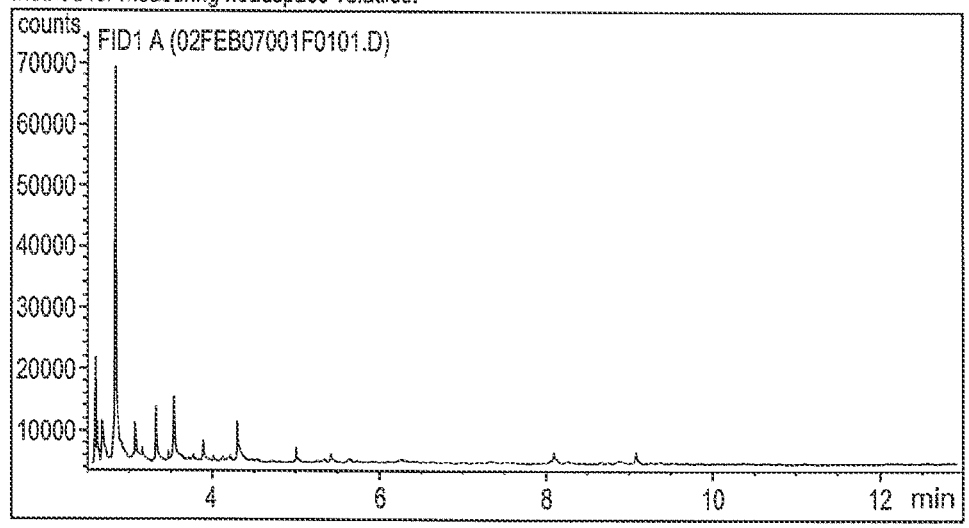
FIG. 7 is a gas chromatograph of gas removed from the headspace of a vessel containing a composition.
Figure 8:
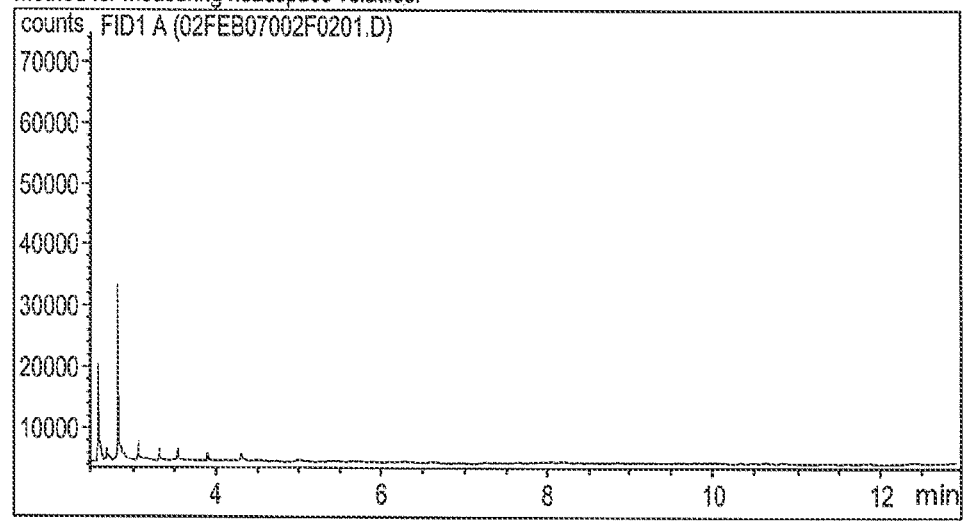
FIG. 8 is a gas chromatograph of gas removed from the headspace of another vessel containing a composition of the invention.

Table 3 shows the gas chromatographic results obtained from the four methyl β-cyclodextrin samples. All activated charcoal containing samples showed substantial reduction of decomposition volatiles. FIGS. 7 and 8 provide the chromatographic profiles of the thermal decomposition products of methyl β-cyclodextrin, and methyl β-cyclodextrin containing 0.1% activated carbon (based on weight of β-cyclodextrin).

TABLE 3

Gas chromatograph SPME headspace results of a 35 wt % methyl β cyclodextrin solution, dried to remove water, and heated to 290° C. for 2 minutes.

| Activated Charcoal wt % | Gas Chromatography Area Counts | Percent (%) Reduction in Thermal Decomposition Products |
|---|---|---|
| 0 | 304,903 | NA |
| 0.01 | 141,388 | 53.6 |

TABLE 3-continued

Gas chromatograph SPME headspace results of a 35 wt % methyl β cyclodextrin solution, dried to remove water, and heated to 290° C. for 2 minutes.

| Activated Charcoal wt % | Gas Chromatography Area Counts | Percent (%) Reduction in Thermal Decomposition Products |
|---|---|---|
| 0.10 | 84,957 | 72.1 |
| 1.0 | 71,705 | 76.5 |

Example 5

A 46.7 wt % methyl β-cyclodextrin (degree of substitution 1.0) solution was prepared in deionized water by adding 280 grams of methyl beta cyclodextrin (dried at 100° C. for 16 hrs.) to 320 grams deionized water. The 600 grams of methyl β-cyclodextrin was split into two 300 gram samples—Solution A and B. Solution A comprised a 46.7 wt % methyl beta cyclodextrin aqueous solution.

Coconut charcoal previously ground in a mortar and pestle was dispersed into the Solution B at 0.280 grams. Solution B was then centrifuged at 750 rpm for 30 minutes. An upper aliquot of the centrifuged solution was used to coat the PET chip.

Both Solutions A and B were coated directly onto PET chips (Voridian PET 9921W, manufactured by Eastman Chemical of Kingsport, Tenn.) having an intrinsic viscosity of 0.76+/−0.02 dl/g and density of 1.2 g/cm$^3$ using the following procedure.

PET chips were coated with approximately 0.75 wt % β-cyclodextrin using both Solution A and Solution B. About 2.0 kg of PET resin was added to a 4-liter wide-mouth tared bottle with TFE lined closure. The bottle was heated to 100° C. prior to adding 8.35 g of a coating Solution A, by pouring into the center of the bottle to avoid solution contact with the glass. The coating solution weight was measured to within 0.01 gram by placing the jar with PET chip on an analytical balance. The resin was mixed on a rolling mixer at 30 rpm for 15 minutes to wet coat the PET chip. The cap was then removed from the upright bottle, and the bottle was placed in a vacuum oven at 115° C. to remove the water (0.9" Hg pressure) and set the coating on the PET chip. Three additional coatings were made for a total of four coating. For Solution A, taking into account the loss associated with coating on the bottle wall, the PET chip was found to be coated at a concentration of 0.75 wt %. The vacuum oven-dried PET chip was transferred from the bottle to the injection molder inline dryer and dried at normal conditions prior to injection molding. The bottle was reweighed to determine methyl β-cyclodextrin coating loss.

Solution 'B' was coated in an identical manner. The solution coated and dried chip samples Chip A (coated with Solution A), Chip B (coated with Solution B), and a control sample with no coating, Chip C, were dried in a vacuum oven at 105° C. at <0.1" Hg. Chip A and Chip B were each individually blended with uncoated PET at a 1:10 ratio of coated PET:virgin PET, producing a 750 ppm methyl β-cyclodextrin concentration. Chip B also containing 1.5 ppm activated carbon. Chips A and B in the 1:10 blend with virgin PET, and Chip C were injection molded producing dog bones on a single-cavity injection-molding machine for color analysis. Table 4 shows the injection molding machine operating parameters. The color of the dog bones was determined by ASTM D 6290-98 using a Color-Eye 7000A spectrophotometer, and reported as the Hunter L, a and b standard units in Table 5.

TABLE 4

PET injection molding parameters.

| Parameter | Value |
|---|---|
| Extruder Temp. | 285° C. |
| Mold Manifold Temp. | 272° C. |
| Mold Gate Temp. | 300° C. |
| Mold gate Dia. | >3 mm |
| Screw Speed | 70 rpm |
| Screw ration | 20:1 |
| Back pressure | 900 pKa |
| Cavity Fill Time | 4 sec. |
| Hold Pressure | 55,000 pKa |
| Mold Cooling Temp. | 48° C. |

TABLE 5

Hunter color measurements for injection molded PET samples.

| Sample ID | Description | L | a | b |
|---|---|---|---|---|
| A | 750 ppm methyl β-cyclodextrin | 86.3 | −0.88 | 9.87 |
| B | 750 ppm methyl β-cyclodextrin with 1.5 ppm activated carbon | 90.0 | −0.79 | 3.83 |
| C | Control resin | 90.9 | −0.60 | 1.16 |

Figure 9:
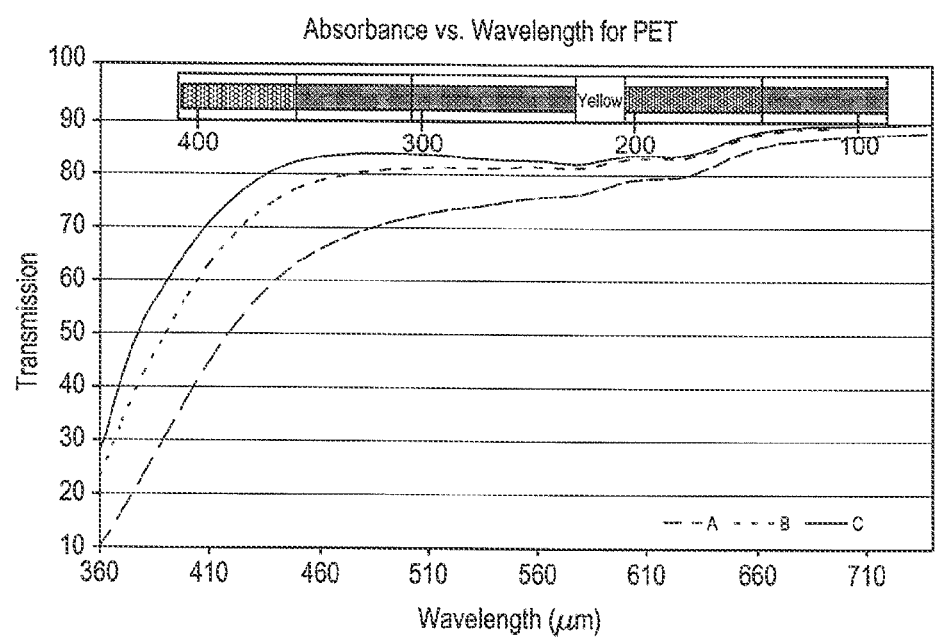
FIG. 9 is a plot showing transmission as a function of wavelength for a composition of the invention.

Table 5 shows activated carbon contained in the chip coating significantly improves all Hunter color measurements. The visible wavelength scan provided in FIG. 9 shows an improvement with the activated carbon over the entire spectrum of visible light. Removing the thermal decomposition products produced from the impurities found methyl β-cyclodextrin during the injection molding process significantly improved off-color in PET and no visible impact visual clarity with the introduction of small particle size activated carbon.

Additionally, on visual inspection of the dog bones, carbon particles were not visible to the unaided eye. Nor were there any visible physical defects, such as streaking, bubbles, or the like, to indicate physical defects caused by the presence during processing of carbon particles or β-cyclodextrin.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of making a polyester composition, the method comprising
   contacting water, activated carbon, and a methyl or acetyl substituted cyclodextrin compound having a degree of substitution of about 0.3 to 2.5 to provide a contacted combination, wherein the ratio of the activated carbon to cyclodextrin in the contacted combination is about 1:2 to 1:40,000 by weight;
   maintaining the contacting for a period of about 0.5 hours to 24 hours;
   after the period, filtering the contacted combination through a filter having pore sizes from about 10 nm to 100 μm to form a filtrate comprising cyclodextrin and activated carbon, wherein the filtering is at a temperature of about 50° C. to about 80° C.; and applying the filtrate to a thermoplastic polyester to form the polyester composition.

2. A method of making a polyester composition, the method comprising contacting water, activated carbon, and a methyl or acetyl substituted cyclodextrin compound having a degree of substitution of about 0.3 to 2.5 to provide a contacted combination, wherein the ratio of activated carbon to cyclodextrin in the contacted combination is about 1:2 to 1:40,000 by weight;
    maintaining the contacting for a period of about 0.5 hours to 24 hours;
    after the period, centrifuging the contacted combination at 500 to 1000 rpm to form a centrifuged combination;
    collecting a supernatant liquid comprising cyclodextrin and activated carbon from the centrifuged combination; and
    applying the supernatant liquid to a thermoplastic polyester to form the polyester composition.

3. A coated polyester article formed by
    contacting water, activated carbon, and a methyl or acetyl substituted cyclodextrin compound having a degree of substitution of about 0.3 to 2.5 to provide a contacted combination, wherein the ratio of the activated carbon to cyclodextrin in the contacted combination is about 1:2 to 1:40,000 by weight;
    maintaining the contacting for a period of about 0.5 hours to 24 hours;
    after the period, centrifuging the contacted combination at 500 to 1000 rpm to form a centrifuged combination;
    collecting a supernatant liquid comprising cyclodextrin and activated carbon from the centrifuged combination;
    coating the supernatant liquid onto a polyester article to provide a coating on the polyester article; and
    drying the coating to provide the coated polyester article, wherein the coating comprises cyclodextrin and activated carbon.

4. The method of claim 1 wherein the contacting comprises dissolving about 1.5 wt % to about 50 wt % of the cyclodextrin compound in the water to form an aqueous solution; and
    adding the activated carbon to the solution at a ratio of about 10 liters to about 350 liters of the solution per 1 kg activated carbon.

5. The method of claim 1 wherein the filtering comprises filtering the contacted combination through a filter having pore sizes from about 0.1 µm to 20 µm.

6. The method of claim 1 further comprising drying the filtrate prior to the applying, further wherein the applying comprises melt processing.

7. The method of claim 1 wherein the applying comprises applying the filtrate to a first amount of the thermoplastic polyester to form a masterbatch; and blending the masterbatch with a second amount of thermoplastic polyester in a masterbatch-to-polyester ratio of 1:1 to about 1:40 by weight.

8. The method of claim 7 wherein the masterbatch comprises about 100 to about 150,000 parts by weight of cyclodextrin per one million parts by weight of the composition.

9. The method of claim 7 wherein the masterbatch comprises about 0.005 to about 5000 parts by weight of activated carbon per one million parts by weight of the coated polyester composition.

10. The method of claim 1 wherein the applying comprises coating the filtrate on polyester chips or pellets and drying the coated chips or pellets.

11. The method of claim 10 further comprising combining the polyester composition with additional polyester chips or pellets to provide a combination; and melt processing the combination to provide a melt processed combination.

12. The method of claim 11 wherein the melt processed combination comprises 0.05 ppm to 100 ppm of activated carbon based on the weight of the polyester.

13. The method of claim 1 wherein the applying comprises melt processing.

14. The method of claim 11 wherein the melt processing comprises thermoforming.

15. The method of claim 14 wherein the thermoforming is extrusion, coextrusion, profile extrusion, injection molding, blow molding, injection blow molding, electro spinning, spunbonding, meltblowing, uniaxial orientation, biaxial orientation, or a combination thereof.

* * * * *